(12) United States Patent
Wu et al.

(10) Patent No.: US 12,124,540 B2
(45) Date of Patent: Oct. 22, 2024

(54) METHOD, APPARATUS FOR ZONE DIVISION OF CLOSED SPACE AND MOBILE DEVICE

(71) Applicant: Qfeeltech (Beijing) Co., Ltd., Beijing (CN)

(72) Inventors: Chenhao Wu, Beijing (CN); Minsheng Wu, Beijing (CN); Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 397 days.

(21) Appl. No.: 17/509,039

(22) Filed: Oct. 24, 2021

(65) Prior Publication Data
US 2022/0044410 A1    Feb. 10, 2022

Related U.S. Application Data

(63) Continuation of application No. PCT/CN2020/078543, filed on Mar. 10, 2020.

(30) Foreign Application Priority Data

Apr. 26, 2019    (CN) .................. 201910342612.1

(51) Int. Cl.
*G06F 18/00*    (2023.01)
*G06F 18/23*    (2023.01)
(Continued)

(52) U.S. Cl.
CPC .............. *G06F 18/23* (2023.01); *G06T 7/11* (2017.01); *G06T 7/162* (2017.01); *G06T 2207/30241* (2013.01)

(58) Field of Classification Search
CPC .......... G06F 18/23; G06F 18/232; G06T 7/11; G06T 7/162; G06T 2207/30241; G06T 7/136; G06T 7/12; G06T 7/13
See application file for complete search history.

(56) References Cited

U.S. PATENT DOCUMENTS

2015/0223659 A1*    8/2015    Han .................... A47L 11/4011
                                                                    134/18

FOREIGN PATENT DOCUMENTS

| CN | 107833230 A | 3/2018 |
|---|---|---|
| CN | 104825101 B | 4/2018 |

(Continued)

OTHER PUBLICATIONS

Lee et al., Map refinement for mobile robot navigation by polygonal approximation and distance transformation, 10th International Conference on Signal Processing and Communication Systems (ICSPCS) (pp. 1-3) (Year: 2016).*

(Continued)

*Primary Examiner* — Ping Y Hsieh
*Assistant Examiner* — Xiao Liu
(74) *Attorney, Agent, or Firm* — MILLBURN IP PLLC

(57) ABSTRACT

A method includes obtaining a map of a closed space. The method also includes obtaining trajectory points. The method also includes processing the trajectory points, and recognizing a correct door in the closed space based on the map and a result of processing the trajectory points. The method also includes dividing the closed space into zones based on the correct door and the map.

18 Claims, 23 Drawing Sheets

(51) Int. Cl.
    *G06T 7/11*          (2017.01)
    *G06T 7/162*       (2017.01)

(56) References Cited

FOREIGN PATENT DOCUMENTS

| CN | 108143364 A | * | 6/2018 | ............ | A47L 11/40 |
| WO | 2008136570 A1 | | 11/2008 | | |

OTHER PUBLICATIONS

International Search Report and Written Opinion and their English translations, issued on Jun. 12, 2020, in International Application No. PCT/CN2020/078543, filed on Mar. 10, 2020 (12 pages).

\* cited by examiner

METHOD, APPARATUS FOR ZONE DIVISION OF CLOSED SPACE AND MOBILE DEVICE

CROSS-REFERENCE TO RELATED APPLICATIONS

This application is a continuation application of International Application No. PCT/CN2020/078543, filed on Mar. 10, 2020, which claims priority to Chinese Patent Application No. 201910342612.1, filed on Apr. 26, 2019. The entire contents of all of the above-mentioned applications are incorporated herein by reference.

TECHNICAL FIELD

The present invention relates to the field of mobile devices and, more specifically, to a method, apparatus for zone division of a closed space and a mobile device.

BACKGROUND

Mobile devices refer to devices that autonomously execute predetermined tasks in a predetermined closed space. Currently available mobile devices generally include, but are not limited to, cleaning robots (e.g., smart floor sweeping devices, smart floor mopping devices, window cleaning robots), companion type mobile robots (e.g., smart electronic pets, nanny robots), service type mobile robots (e.g., reception robots for hotels, inns, meeting places), industrial inspection smart devices (e.g., electric power inspection robots, smart forklifts, etc.), security robots (e.g., home or commercial smart security robots).

A mobile device moves in a closed space. To better accomplish predetermined tasks, it typically needs to differentiate rooms, such that it can move to a designated room, or to perform a regional cleaning, etc. In conventional technologies, when dividing a room into zones, a mobile device typically first recognizes a center of the room, then expands from the center outwardly to the boundary. However, this room division method has certain issues in the accuracy and division efficiency.

SUMMARY OF THE DISCLOSURE

To resolve the issues existing in relevant technologies to at least a certain extent, the present invention provides a method, apparatus for zone division of a closed space and a mobile device.

According to a first aspect of the embodiments of the present invention, a method for zone division of a closed space is provided, including:
  obtaining a map of the close space;
  obtaining trajectory points;
  processing the trajectory points, and recognizing a correct door of the close space based on the map and a result of processing the trajectory points;
  dividing the closed space into zones based on the correct door and the map.

In some embodiments, processing the trajectory points, and recognizing the correct door of the closed space based on the map and the result of processing the trajectory points includes:
  determining candidate points based on the trajectory points;
  clustering the candidate points into a plurality of clusters and determining cluster representative points in the clusters;
  filtering the cluster representative points to determine candidate doors;
  filtering the candidate doors to obtain reasonable doors;
  fusing zones divided by the reasonable doors and filtering the reasonable doors to obtain the correct door.

In some embodiments, the trajectory points include: actual trajectory points, and/or, virtual trajectory points. Obtaining the trajectory points includes:
  obtaining the actual trajectory points traversed by a mobile device in the closed space; and/or,
  generating virtual trajectory points in a map of the closed space based on a predetermined virtual trajectory point generating algorithm;

In some embodiments, obtaining the map of the closed space includes:
  obtaining an original map of the closed space;
  processing the original map to extract profiles;
  filtering the profiles to generate reserved profiles; and
  drawing the map of the closed space based on reserved profiles.

In some embodiments, determining the candidate points based on the trajectory points includes:
  for each trajectory point, determining selectable segments, wherein each selectable segment is determined as a segment formed by crossing points between a straight line passing the trajectory point and extending in a selectable direction and boundaries of obstacles located at two sides of the trajectory point;
  determining a segment to be adopted from the selectable segments;
  determining a middle point of the segment to be adopted as a candidate point;

In some embodiments, determining the segment to be adopted from the selectable segments includes:
  selecting a shortest segment from all of the selectable segments and determining the shortest segment as the segment to be adopted; or,
  selecting the shortest segment from all of the selectable segments, and determining the selected shortest segment as the segment to be adopted if a length of the selected shortest segment is within a predetermined length range; or
  selecting one or more selectable segments from all of the selectable segments, a length of the one or more selected selectable segments being within the predetermined length range, and determining a shortest segment from the one or more selected selectable segments as the segment to be adopted.

In some embodiments, clustering the candidate points includes: for two candidate points, if a distance between the two candidate points is smaller than a sum of radii corresponding to the two candidate points, clustering the two candidate points in a same cluster; wherein, a radius corresponding to a candidate point is one half of a length of a shortest segment on which the candidate point is located;

In some embodiments, determining the cluster representative points in the clusters includes: in each cluster, determining a candidate point that corresponds to a shortest radius as a cluster representative point for the cluster;

In some embodiments, filtering the candidate doors to obtain the reasonable doors includes: for each candidate door, obtaining an area of a closed zone corresponding to the candidate door, and a length ratio between a length of the closed zone in a predetermine direction and a length of the candidate door; reserving the candidate door as a reasonable door if the area is within a predetermined area range, and if the length ratio is within a predetermined length ratio range.

In some embodiments, filtering the cluster representative points to determine the candidate doors includes:
- determining selection zones where the cluster representative points are located;
- selecting one or more points within the selection zones;
- for each selected point, drawing a straight line passing the selected point and extending in a direction parallel with a shortest segment on which a cluster representative point is located; wherein the straight line intersects the boundaries of obstacles located at two sides of the selected point at two crossing points, and the distance of the two crossing points between the straight line and boundaries of obstacles located at two sides of the selected point is referred to as a metric value;
- constructing a graph based on the one or more selected points from the selection zone, wherein, the constructed graph includes at least two dimensions including a first dimension and a second dimension, the first dimension is a dimension where the metric values belong to, the second dimension is a dimension where projected distance values belong to, each of the projected distance values is a component of a distance value between each selected point and the cluster representative point in a direction perpendicular to a metric value direction;
- determining a door corresponding to the cluster representative point as a candidate door if the projected distance values and the corresponding metric values between the cluster representative point and the one or more selected points have a proportional relationship; and
- removing the cluster representative point if the projected distance values and the corresponding metric values between the cluster representative point and the one or more selected points do not have a proportional relationship,
- wherein the proportional relationship is a relationship, in which as the projected distance values between the cluster representative point and the one or more selected points decrease, a metric value of a corresponding selected point in the first dimension remains unchanged or decreases.

In some embodiments, determining the selection zones where the cluster representative points are located includes:
- for each cluster representative point, determining a selection zone rectangle using the cluster representative point as a center, using N times of a length of the shortest segment on which the cluster representative point is located as a width, using the metric value direction as a width direction, using M times of the length of the shortest segment on which the cluster representative point is located as a longitudinal distance, and using the second dimension as a longitudinal direction, wherein, N and M are predetermined values, and N is smaller than or equal to M;
- wherein selecting the one or more points within the selection zones includes:
- selecting the one or more points in the longitudinal direction that is parallel with the selection zone rectangle, or selecting the one or more points within the selection zone rectangle;
- constructing the graph based on the one or more selected points from the selection zone includes:
- constructing a two-dimensional graph based on horizontal and vertical coordinate axes that are in directions parallel with the longitudinal direction and the width direction of the selection zone rectangle respectively, wherein, horizontal coordinates and vertical coordinates in the two-dimensional graph are the projected distance values and the metric values corresponding to the selected points, respectively.
- wherein, determining a door corresponding to the cluster representative point as the candidate door if the projected distance values and the corresponding metric values between the cluster representative point and the one or more selected points have the proportional relationship, includes:
- reserving the cluster representative point and determining a door corresponding to the cluster representative point as a candidate door if the two-dimensional graph is a valley shape graph.

In some embodiments, fusing zones divided by the candidate doors, and filtering the reasonable doors to obtain the correct door includes:
- for each reasonable door, obtaining two zones connected by the reasonable door as a first candidate zone and a second candidate zone;
- determining a first segment and a second segment in the first candidate zone and the second candidate zone, respectively, wherein the first segment is a segment formed by a middle point of the reasonable door and a first crossing point, the second segment is a segment formed by the middle point of the reasonable door and a second crossing point, the first crossing point is a farthest crossing point between a first ray and the first candidate zone in a direction perpendicular to the reasonable door, the second crossing point is a farthest crossing point between a second ray and the second candidate zone in the direction perpendicular to the reasonable door, the first ray is a ray starting from the middle point of the reasonable door and extending toward the first candidate zone in a direction perpendicular to the reasonable door, the second ray is a ray starting from the middle point of the reasonable door and extending toward the second candidate zone in the direction perpendicular to the reasonable door.
- selecting a same number of sparse points on the first segment and the second segment, and calculating a distance value corresponding to each sparse point, wherein the distance value corresponding to each sparse point includes: a first distance value and a second distance value; the first distance value is a distance value from the sparse point to a crossing point at a first side of the sparse point between a straight line passing the sparse point and extending in parallel with the reasonable door, and a boundary of a candidate zone in which the sparse point is located; the second distance value is a distance value from the sparse point to a crossing point at a second side of the sparse point between the straight line passing the sparse point and extending in parallel with the reasonable door and a boundary of the candidate zone in which the sparse point is located, the first side and the second side of the sparse point are two direction of the straight line passing the sparse point and extending in parallel with the reasonable door relative to the sparse point;
- calculating a variance based on distance values corresponding to all sparse points within the first candidate zone and the second candidate zone; reserving the reasonable door as the correct door if the variance is greater than a predetermined value, or fusing the first candidate zone and the second candidate zone into a same zone if the variance is smaller than or equal to the predetermined value.

In some embodiments, the method also includes:

within zones obtained through the zone division, executing the predetermined task of the mobile device in separate zones.

According to a second aspect of the embodiments of the present invention, an apparatus for zone division of a closed space is provided, the apparatus including: a map obtaining device configured to obtain a map of a closed space; a trajectory point obtaining device configured to obtain trajectory points; a recognition device configured to process the trajectory points, and recognize a correct door in the closed space based on the map and a result of processing the trajectory points; a division device configured to divide the closed space into zones based on the map and the correct door.

In some embodiments, the recognition device includes: a candidate point determining unit configured to determine candidate points based on the trajectory points; a clustering unit configured to cluster the candidate points into a plurality of clusters, and determine cluster representative points in the clusters; a candidate door determining unit configured to filter the cluster representative points to determine candidate doors; a reasonable door determining unit configured to filter the candidate doors to determine reasonable doors; a zone fusing unit configured to fusing zones divided by the reasonable doors, and to filter the reasonable doors to obtain the correct door.

In some embodiments, the trajectory points include: actual trajectory points, and/or, virtual trajectory points. The trajectory point obtaining device is configured to: obtain the actual trajectory points traversed by a mobile device in the closed space; and/or, generate the virtual trajectory points in the map of the closed space based on a predetermined virtual trajectory point generating algorithm.

In some embodiments, the candidate point determining unit is configured to: for each trajectory point, determine selectable segments each formed by crossing points between a straight line passing the trajectory point and extending in a selectable direction and boundaries of obstacles located at two sides of the trajectory point; determine a segment to be adopted from the selectable segments; determine a middle point of the segment to be adopted as a candidate point.

In some embodiments, the candidate point determining unit is further configured to: select a shortest segment from all of the selectable segments, and determining the selected shortest segment as the segment to be adopted; or, select the shortest segment from all of the selectable segments, and determine the selected shortest segment as the segment to be adopted if a length of the selected shortest segment is within a predetermined length range; or, select one or more selectable segments from all of the selectable segments, a length of the one or more selected selectable segments being within the predetermined length range, and determine a shortest segment from the one or more selected selectable segments as the segment to be adopted.

In some embodiments, the clustering unit is configured to: for two candidate points, if a distance between the two candidate points is smaller than a sum of radii corresponding to the two candidate points, cluster the two candidate points in a same cluster; wherein, a radius corresponding to a candidate point is one half of a length of a shortest segment on which the candidate point is located.

In some embodiments, the clustering unit is also configured to: in each cluster, determine a candidate point that corresponds to a shortest radius as a cluster representative point for the cluster.

In some embodiments, the candidate door determining unit is configured to: determine selection zones where the cluster representative points are located; select one or more points within the selection zones; for each selected point, draw a straight line passing the selected point and extending in parallel with a shortest segment on which a cluster representative point is located, and calculate metric values of crossing points between the straight line and boundaries of obstacles located at two sides of the selected point; construct a graph based on the one or more selected points from the selection zone, wherein the constructed graph includes at least two dimensions including a first dimension and a second dimension, the first dimension is a dimension where the metric values belong to, the second dimension is a dimension where projected distance values belong to, each of the projected distance values is a component of a distance value between each selected point and the cluster representative point in a direction perpendicular to a metric value direction; determine a door corresponding to the cluster representative point as a candidate door if the projected distance values and the corresponding metric values between the cluster representative point and the one or more selected points have a proportional relationship; remove the cluster representative point if the projected distance values and the corresponding metric values between the cluster representative point and the one or more selected points do not have a proportional relationship; wherein the proportional relationship is a relationship, in which as the projected distance values between the cluster representative point and the one or more selected points decrease, a metric value of a corresponding selected point in the first dimension remains unchanged or decreases.

In some embodiments, the door determining unit is further configured to: for each cluster representative point, determine a selection zone rectangle using the cluster representative point as a center, using N times of a length of the shortest segment on which the cluster representative point is located as a width, using the metric value direction as a width direction, using M times of the length of the shortest segment on which the cluster representative point is located as a longitudinal distance, and using the second dimension as a longitudinal direction, wherein, N and M are predetermined values, and N is smaller than or equal to M; selecting the one or more points in the longitudinal direction that is parallel with the selection zone rectangle; for each selected point, draw a straight line passing the selected point and extending in parallel with a shortest segment on which a cluster representative point is located, and calculate metric values of crossing points between the straight line and boundaries of obstacles located at two sides of the selected point; construct a two-dimensional graph based on horizontal and vertical coordinate axes that are in directions parallel with the longitudinal direction and the width direction of the selection zone rectangle respectively; reserve the cluster representative point and determine a door corresponding to the cluster representative point as a candidate door if the two-dimensional graph is a valley shape graph.

In some embodiments, the reasonable door determining unit is configured to: for each candidate door, obtain an area of a closed zone corresponding to the candidate door, and a length ratio between a length of the closed zone in a predetermine direction and a length of the candidate door; reserving the candidate door as a reasonable door if the area is within a predetermined area range, and if the length ratio is within a predetermined length ratio range.

In some embodiments, the zone fusing unit is configured to: for each reasonable door, obtain two zones connected by the reasonable door as a first candidate zone and a second candidate zone; determine a first segment and a second segment in the first candidate zone and the second candidate zone, respectively, wherein the first segment is a segment formed by a middle point of the reasonable door and a first crossing point, the second segment is a segment formed by the middle point of the reasonable door and a second crossing point, the first crossing point is a farthest crossing point between a first ray and the first candidate zone in a direction perpendicular to the reasonable door, the second crossing point is a farthest crossing point between a second ray and the second candidate zone in the direction perpendicular to the reasonable door, the first ray is a ray starting from the middle point of the reasonable door and extending toward the first candidate zone in a direction perpendicular to the reasonable door, the second ray is a ray starting from the middle point of the reasonable door and extending toward the second candidate zone in the direction perpendicular to the reasonable door; select a same number of sparse points on the first segment and the second segment, and calculate a distance value corresponding to each sparse point, wherein the distance value corresponding to each sparse point includes: a first distance value and a second distance value; the first distance value is a distance value from the sparse point to a crossing point at a first side of the sparse point between a straight line passing the sparse point and extending in parallel with the reasonable door, and a boundary of a candidate zone in which the sparse point is located; the second distance value is a distance value from the sparse point to a crossing point at a second side of the sparse point between the straight line passing the sparse point and extending in parallel with the reasonable door and a boundary of the candidate zone in which the sparse point is located, the first side and the second side of the sparse point are two direction of the straight line passing the sparse point and extending in parallel with the reasonable door relative to the sparse point; calculate a variance based on distance values corresponding to all sparse points within the first candidate zone and the second candidate zone; reserve the reasonable door as the correct door if the variance is greater than a predetermined value, or fuse the first candidate zone and the second candidate zone into a same zone if the variance is smaller than or equal to the predetermined value.

In some embodiments, the map obtaining device is configured to: obtain an original map, and process the original map to retrieve profiles;

filter the retrieved profiles to generate reserved profiles, and draw the map of the closed space based on reserved profiles.

In some embodiments, the apparatus also includes: an executing device configured to: in the zones obtained through the zone division, execute the predetermined task of the mobile device in separate zones.

According to a third aspect of the embodiments of the present invention, a non-transitory computer-readable storage medium is provided. When instructions stored in the storage medium are executed by a processor of the mobile device, the instructions enable the mobile device to perform the closed space zone division method described in the first aspect.

According to a fourth aspect of the embodiments of the present invention, a mobile device is provided, including: a processor; a storage device configured to store computer-readable instructions; wherein, the processor is configured to execute the computer-readable instructions to perform the closed space zone division method described in the first aspect.

In some embodiments, the mobile device also includes: an execution component configured to be controlled under the processor, to execute a predetermined task of the mobile device in separate zones within the zones obtained in the zone division.

The technical solutions provided by the embodiments of the present invention have the following advantageous effects:

A correct door is recognized in the closed space, and zone division is performed using the correct door. Because it better follows the object rules to perform division based on the door, the zone division accuracy can be increased, which is beneficial for the mobile device to execute tasks in separate zones, thereby increasing the task execution efficiency. Further, the trajectory points are processed to recognize the door, which can reduce the algorithm complexity and improve computation speed.

It should be understood that the above general descriptions and the detailed descriptions in the following texts are merely illustrative and explanatory, and do not limit the scope of the present invention.

BRIEF DESCRIPTION OF THE DRAWINGS

The accompanying drawings are incorporated into the specification as parts of the specification, and show embodiments consistent with the present invention, and are used to explain the principle of the present invention together with the specification.

DETAILED DESCRIPTION

Here, the exemplary embodiments will be described in detail. The exemplary embodiments are shown in the accompanying drawings. When the following descriptions involve drawings, unless otherwise indicated, the same numerals in different drawings represent the same or similar elements. The implementations described in the following exemplary embodiments do not represent all implementations consistent with the present invention. Conversely, they are merely example devices and methods that are consistent with some aspects of the present invention described in detail in the accompanying claims.

Figure 2A:
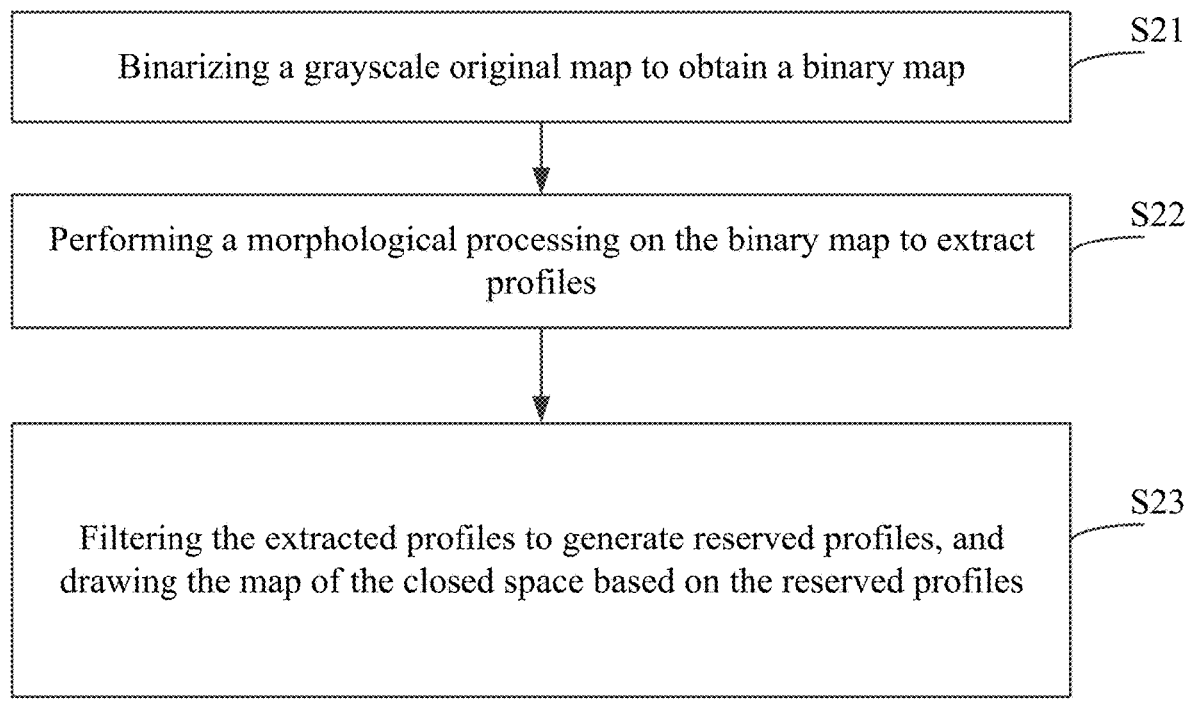
FIG. 2a is a flowchart illustrating pre-processing of an original map to obtain a map of the closed space, according to an embodiment of the present invention.
Figure 4A:
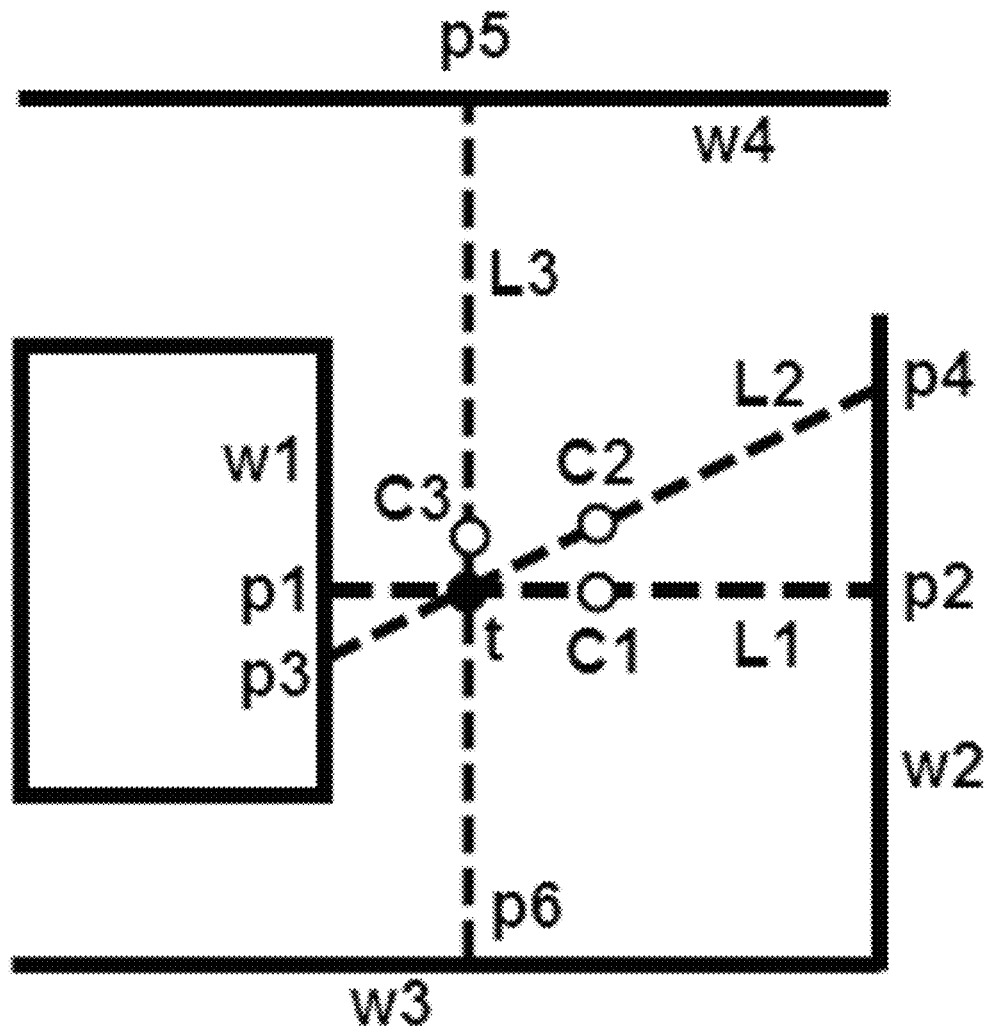
FIG. 4a is a schematic illustration of trajectory points and corresponding candidate points, according to an embodiment of the present invention.
Figure 4B:
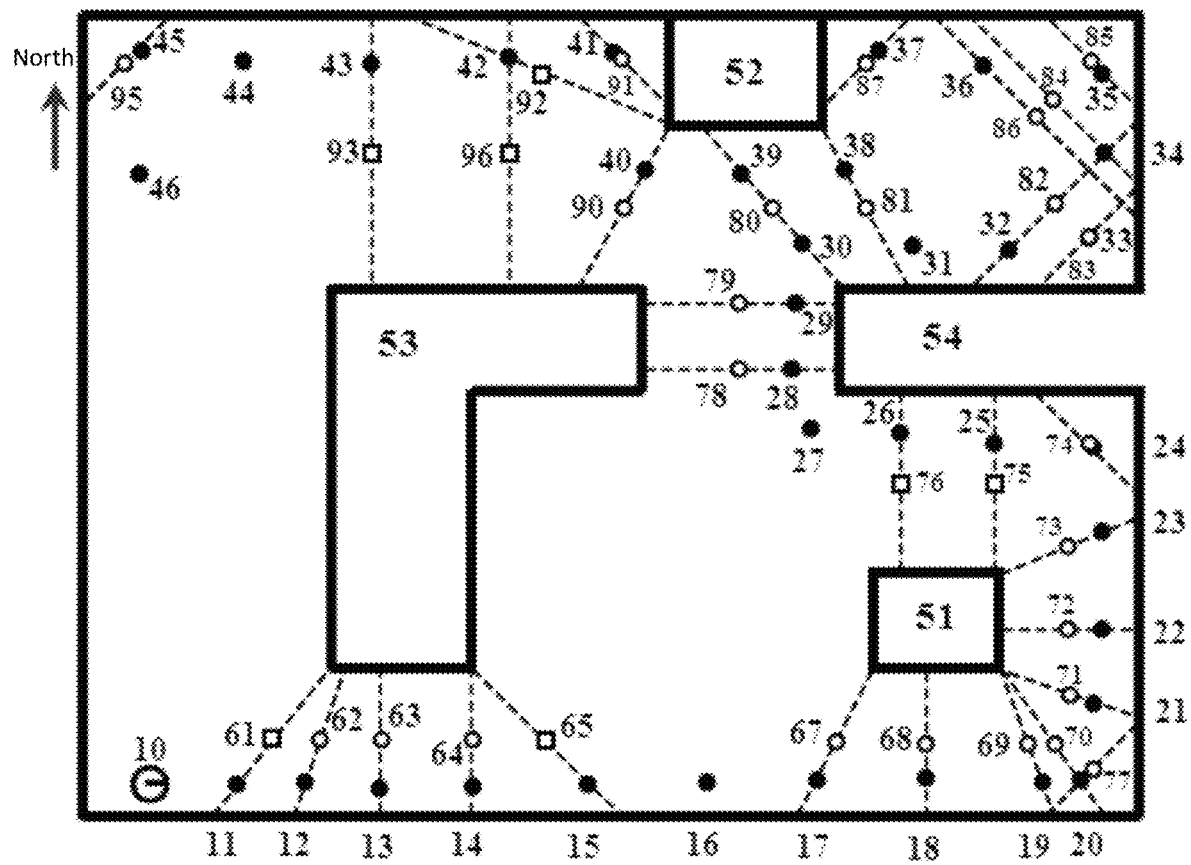
FIG. 4b is a schematic illustration of clustering candidate points and cluster representative points, according to an embodiment of the present invention.

The closed space in the present disclosure refers to an entirely closed space or a partially closed space. Correspondingly, the map of the closed space in the present disclosure refers to the map of an at least partially closed space. For example, the map may be a map of an entirely closed space, as shown in FIG. 2d or FIG. 4b. As shown in FIG. 2d, the space K enclosed by a complete white closing boundary is an entirely closed space. As another example, the map may include a closed part and a non-closed part, as shown in FIG. 4a, FIGS. 5a-5d, or FIG. 6. As shown in FIG. 4a, a boundary w2 and a boundary w3 forms a closed part, the boundary w2 and a boundary w4 or the boundary w3 and the boundary w4 form non-closed parts. As another example, the map may include not only partially or entirely closed spaces, but also an open space extended from the partially or entirely closed space. In some embodiments, the map is a map that includes partially or entirely indoor spaces, and also includes an external open space (e.g., a yard, etc.) connected with the indoor space.

Figure 1:
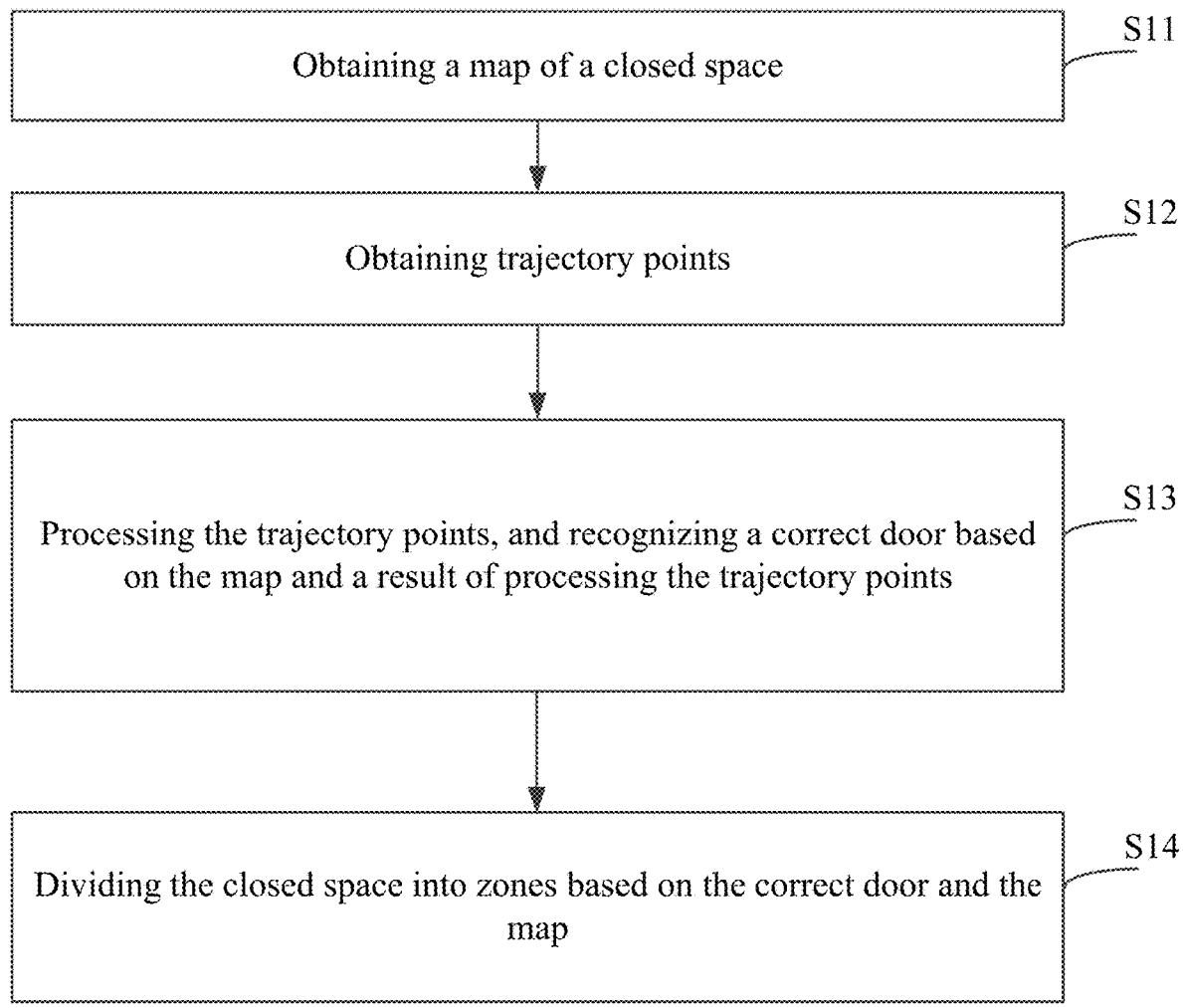
FIG. 1 is a flowchart illustrating a closed space zone division method, according to an embodiment of the present invention.

FIG. 1 is a flow chart illustrating a closed space zone division method, according to an embodiment of the present disclosure. As shown in FIG. 1, the method may include the following steps:

S11: Obtaining a map of a closed space.

In some embodiments, an original map may be directly input, and the input original map may be directly used as the map of the closed space. Alternatively, in some embodiments, the original map may be pre-processed, and the pre-processed original map may be used as the map of the closed space. The original map may be constructed by the mobile device. For example, when the mobile device is a cleaning robot, the cleaning robot may construct a map while executing a cleaning task. The map constructed by the cleaning robot may be used as the original map.

Using pre-processing the original map to obtain the map of the closed space as an example, the related content of the pre-processing can refer to FIG. 2a-FIG. 2d.

S12: Obtaining trajectory points;

Under different conditions, the order of executing the steps S11 and S12 may be exchanged. That is, in some embodiments, step S11 may be executed before step S12, and in some embodiments, step S12 may be executed before step S11. In some embodiments, steps S11 and S12 may be executed simultaneously or randomly without following an order. For example, if at the initial time there is only the original map, then step S11 may be first executed such that the map of the closed space may be obtained through the pre-processing of the original map. Then steps S12 may be executed to obtain the trajectory points from the map of the closed space. If at the initial time there are already coordinates of the trajectory points (e.g., x, y values or x, y, z values), then steps S11 and S12 may be executed simultaneously or randomly without an order.

These combinations of execution orders include an order in which step S12 is executed before step S11. Regarding step S12: one or more trajectory points may be obtained through directly inputting coordinates of the one or more trajectory points. Therefore, a technical person in this field can understand, that the claims of the present disclosure should not be limited by the order in which steps S11 and S12 are executed.

S13: processing the trajectory points, and recognizing a correct door in the closed space based on the map and a result of processing the trajectory points.

The method of the present disclosure differs from the conventional method of expanding outwardly from a zone center. In the present disclosure, when dividing zones, doors are first recognized. Using the doors as the basis, the zone division is performed. Zone division based on the doors are more logical, and therefore, the result of zone division is more accurate.

Recognition of the door is based on the processing of the trajectory points, and is obtained based on the map of the closed space.

In some embodiments, the trajectory points may include: actual trajectory points and/or virtual trajectory points.

The actual trajectory points are trajectory points actually traversed by the mobile device in the closed space.

The virtual trajectory points are virtual points obtained based on the map of the closed space and an algorithm, such as virtual points obtained through a triangulation algorithm.

Therefore, the trajectory points may be obtained through recording the actual trajectory points traversed by the mobile device in the closed space, and/or, through adopting the virtual trajectory points generated by a predetermined algorithm.

Related contents for the correct door recognition process can refer to FIG. 3-FIG. 7.

S14: dividing the closed space into zones based on the correct door and the map.

After recognizing the correct door, different zones divided by the correct door may be used as the zone division results. For example, in room division, each zone divided by the correct door may be treated as a room.

Further, after the mobile device divides the closed space into zones, the mobile device may perform tasks in separate zones. For example, when the mobile device is a cleaning robot, after the cleaning robot divides a closed space into rooms, the cleaning robot may perform cleaning in separate rooms, thereby increasing the cleaning efficiency and saving time.

In the present disclosure, the correct door is recognized in the closed space, and the zone division is performed based on the correct door. Because zone division based on the correct door is more logical, the zone division accuracy can be increased. The mobile device may execute tasks in separate zones, thereby increasing the task execution efficiency. Moreover, recognizing the door through processing the trajectory points can reduce the complexity of the algorithm and increase the computing speed.

In some embodiments, obtaining the map of the closed space may include: obtaining an original map, processing the original map to extract profiles; filtering the profiles to generate reserved profiles, and drawing a map of the closed space based on the reserved profiles. The original map may have various formats, and the processing methods may be different. The original map may be in at least one of the following formats: a grayscale map, a color map, a vector map, a sparse point map. Regardless of the format of the original map, the profiles can be extracted through processing. FIG. 2a is a flow chart illustrating steps of pre-processing a grayscale map to obtain the map of the closed space, according to an embodiment of the present disclosure. Using the grayscale map as an example, as shown in FIG. 2a, the pre-processing may include:

S21: binarizing the grayscale original map to obtain a binary map.

The original map is a grayscale map. Binarizing the original map means converting the grayscale map into the binary map. For example, the process may include setting a threshold, and setting a pixel value of a pixel point whose grayscale value is greater than the threshold as 255 (white). Otherwise, it is set as 0 (black). Thus, the binary map may be obtained.

In some embodiments, the pre-processing may also include: S22: performing a morphological processing of the binary map to extract the profiles.

Morphology, i.e., mathematical morphology, has been widely used in image processing. The main application is to extract image components from an image that are meaningful for expressing and describing a shape of a zone, such that the subsequent recognition process can capture the most distinguishing (or most discriminating) shape features of a target object, such as a boundary, connected areas, etc.

Morphological processing may include eroding, dilating, opening operations and closing operations, etc.

In the present disclosure, closing operations of the morphological processing may be performed on the binary map to increase the number of connected areas, and to reduce noise. It should be noted that the morphological processing may not be needed in the present disclosure. Even if in some embodiments, the morphological processing is not performed on the binary map, as long as the profiles can be extracted from the binary map, subsequent steps can still be executed to obtain the correct door, and to perform zone division based on the correct door.

Because a color map cannot be directly binarized, if the original map is a color map, it can be first converted into a grayscale map. Then the above steps S21 may be performed to binarize the grayscale map, and the above step S22 may be performed to conduct a morphological analysis of the binary map. In some embodiments, the morphological processing may be directly performed on the color original map to extract the profiles, and the binarization may not be performed. Existing profile extraction algorithms may be used to extract the profiles, such as profile extraction based on the tree structure. A profile with the largest area may be used as an outer profile of a room, and a profile with a relatively small area may be used as an inner profile of the zoom.

Figure 2B:
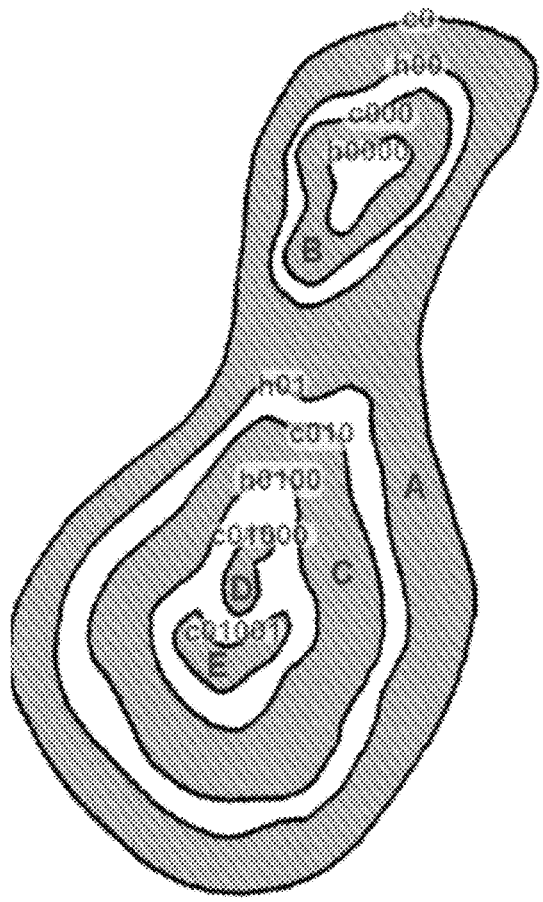
FIG. 2b is a schematic illustration of a retrieved tree structure, according to an embodiment of the present invention.
Figure 2B:
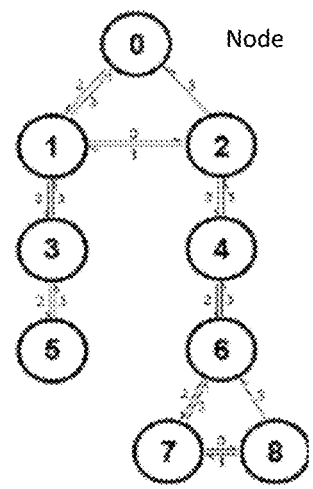

A profile having a tree structure is shown in FIG. 2b. As shown in FIG. 2b, the profile c0 (node 0) and the profiles h00 (node 1) and h01 (node 2) form a zone A; the profile c000 (node 3) and the profile h0000 (node 5) form a zone B; the profile c010 (node 4) and the profile h0100 (node 6) form a zone C; a zone D is within the profile c01000 (node 7); a zone E is within the profile c01001 (node 8).

S23: filtering the extracted profiles to generate reserved profiles, and drawing the map of the closed space based on the reserved profiles.

After the inner and outer profiles having the tree structure as shown in FIG. 2b, each node in the profile tree may be traversed from top to bottom. On one hand, among the sub-zones in a largest zone, only the sub-zone having the largest area may be reserved (as shown in FIG. 2b, the zone A is the largest zone, and zones B and C are sub-zones of the zone A; zone C is the sub-zone having the largest area in zone A, therefore, only sub-zone C may be reserved and sub-zone B may be removed). On the other hand, inner profiles may be reserved based on the areas and perimeters, and noise of the inner profiles may be removed (for example, zones having areas smaller than 1 $m^2$ may be removed, such as zones representing legs of tables that are not useful for zoom division).

For all reserved inner and outer profiles, the reserved profiles are used as boundaries of obstacles in the map. The map to be subsequently processed may be drawn based on the reserved profiles.

Figure 2C:
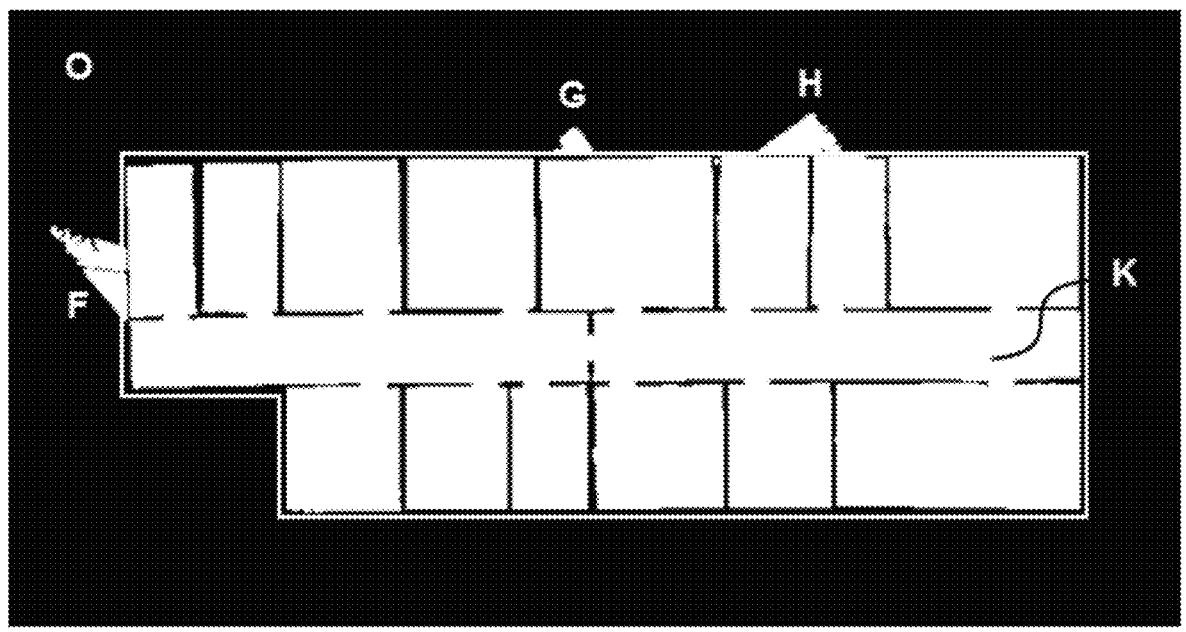
FIG. 2c is schematic illustration of an original map, according to an embodiment of the present invention.
Figure 2D:
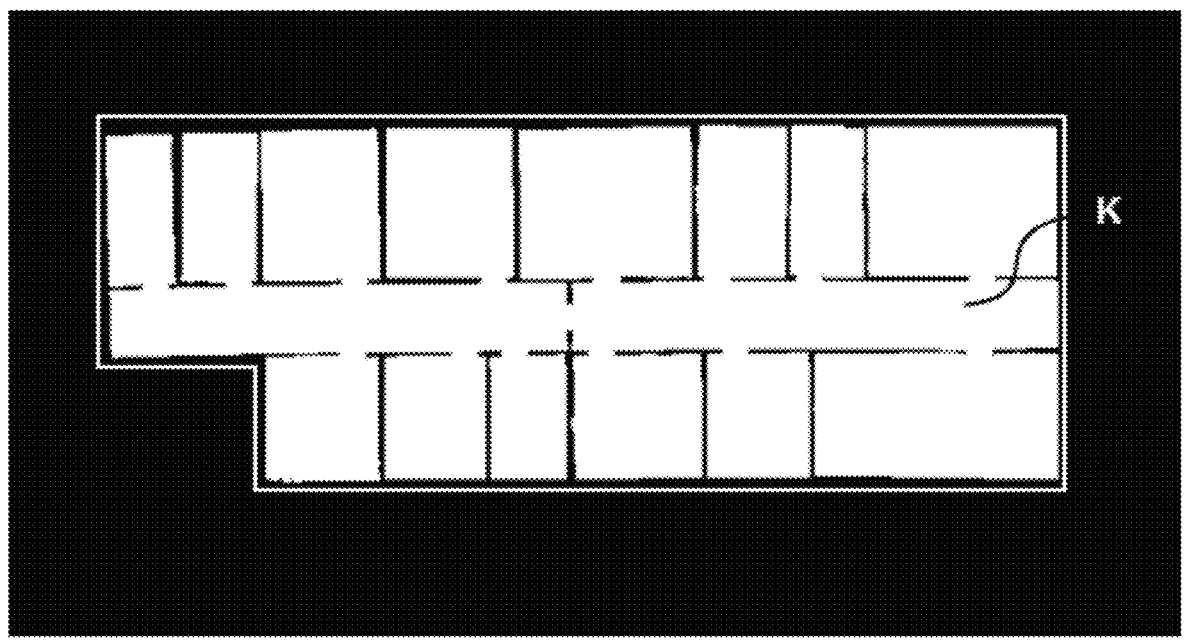
FIG. 2d is a schematic illustration of pre-processing the original map to obtain the map for the closed space, according to an embodiment of the present invention.

For example, after being processed in step S21, the grayscale map may be converted into the binary map shown in FIG. 2c. After undergoing the morphological processing of step S22 and after the profiles are extracted, a zone 0 may be obtained. The zone 0 may include sub-zones F, G, H, K. After the filtering in step S23, the sub-zone K having the largest area may be reserved (i.e., the zone surrounded by the white closing boundaries in the figure), and the sub-zones F, G, H are removed. The map of the closed space shown in FIG. 2d may be obtained.

In this embodiment, the original map is pre-processed. Useless zones may be filtered out (such as the zones F, G, H in FIG. 2c), and the map of the closed space to be divided is generated based on the reserved zone (only the zone K in FIG. 2c is reserved).

Figure 3:
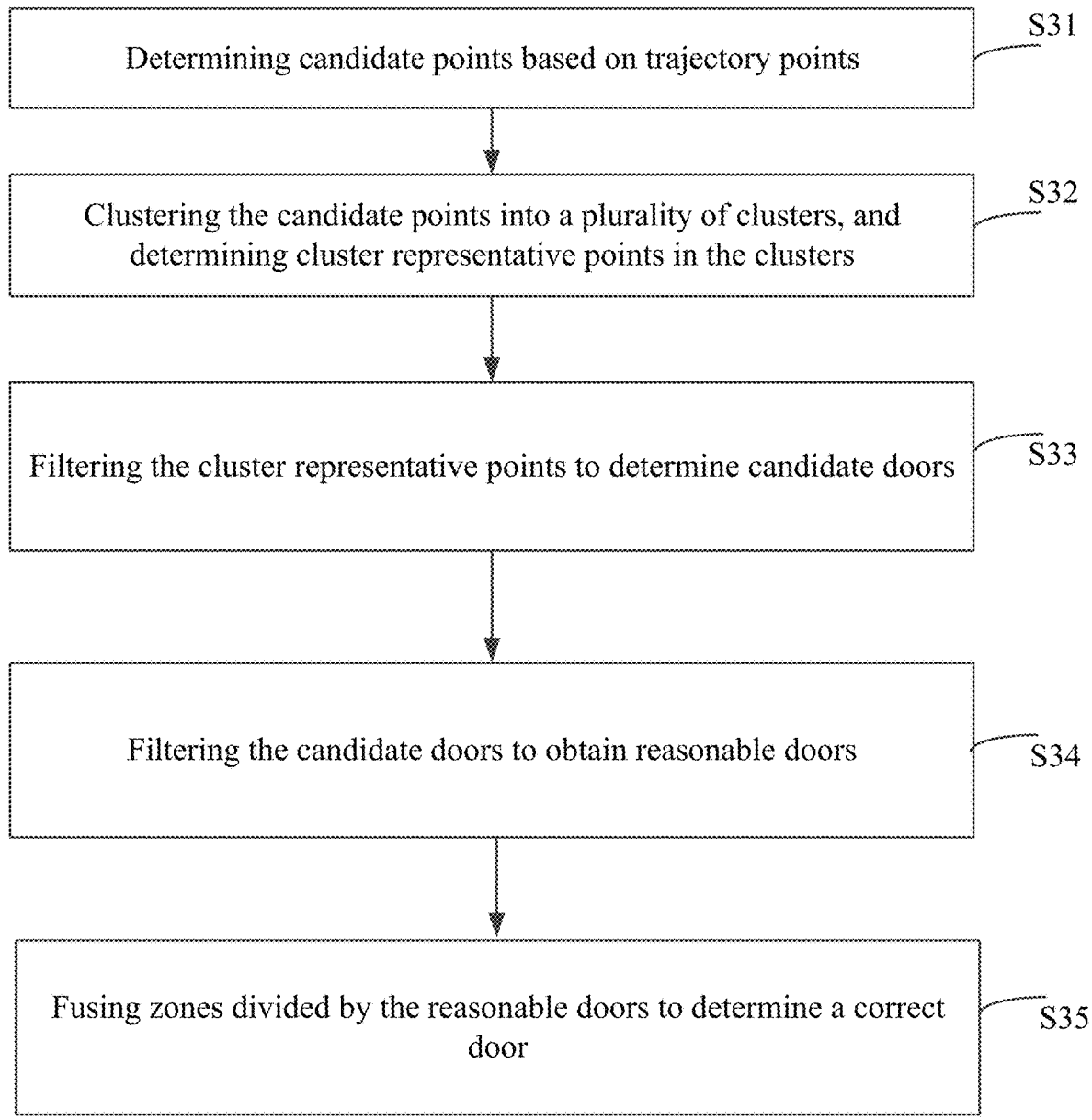
FIG. 3 is a flowchart illustrating recognizing a correct door in the map of the closed space, according to an embodiment of the present invention.

FIG. 3 is a flow chart illustrating the steps of processing the trajectory points and recognizing the correct door in the closed space. As shown in FIG. 3, the steps may include:

S31: determining candidate points based on the trajectory points.

The candidate point is a middle point of a segment to be adopted. The segment to be adopted is determined from selectable segments. A selectable segment is a segment formed by crossing points of a straight line passing the trajectory point and extending in a direction that is a selectable direction and boundaries of obstacles located at two sides of the trajectory point.

A selectable direction may be selected based on needs in the application. For example, using a predetermined direction as a base (e.g., using the x-axis as the base), two directions that are parallel with and perpendicular to the base direction may be selected as selectable directions; alternatively, four directions forming 0° (180°), 45° (225°) 90° (270°), and) 135° (315°) with the base direction may be selected as the selectable directions.

For example, as shown in FIG. 4a, a point t is a trajectory point, the selectable direction is the direction of the three straight lines L1, L2, L3 (shown as a dashed line in FIG. 4a). The straight line L1 crosses boundaries w1, w2 of obstacles at points p1 and p2. The straight line L2 crosses boundaries w1, w2 of the obstacles at points p3 and p4. The straight line L3 crosses boundaries w3, w4 of the obstacles at points p5 and p6. Selectable segments passing the trajectory point t may be: segment p1-p2, segment p3-p4, and segment p5-p6.

In some embodiments, the segment to be adopted may be the shortest segment in all of the selectable segments. For example, among segments p1-p2, p3-p4, and p5-p6, the segment p1-p2 is the shortest segment. Then the segment p1-p2 may be determined as the segment to be adopted.

In some embodiments, the segment to be adopted may satisfy the shortest limitation, and may also satisfy the condition that its length is within a predetermined length range (referred to as a "distance range rule"). The predetermined length range may be a parameter related to a horizontal size of the door. For example, the predetermined length range may be 0.5 m to 2.5 m. When the segment p1-p2 is the shortest segment, if the segment p1-p2 is within the range of 0.5 m to 2.5 m, then the segment p1-p2 may be determined as the segment to be adopted. Otherwise, if the shortest segment (e.g., segment p1-p2) is not within the range of 0.5 m to 2.5 m, then it may be determined that the present trajectory point has not corresponding candidate point, and the present trajectory point may be removed (e.g., trajectory point t).

In some embodiments, the segment to be adopted may be a shortest segment in the selectable segments whose length is within the predetermined length range. In the above embodiment, the shortest segment is first selected, and then a determination is made as to whether the shortest segment is within the predetermined length range. In some embodiments, one or more selectable segments whose length satisfies the predetermined length range may be selected from all of the selectable segments (also referred to as "distance range rule"), and then the shortest segment may be determined from the one or more selectable segments whose length satisfies the predetermined length range. For example, all of the selectable segments passing the trajectory point t may include: segment p1-p2, segment p3-p4, and segment p5-p6. These three segments may be compared with the predetermined length range. Assuming that the segments p1-p2 and p3-p4 are within the predetermined length range, and segment p5-p6 is not within the predetermined length range, then the shortest segment is selected from the segments p1-p2 and p3-p4. Assuming that segment p1-p2 is shorter than segment p3-p4, then the segment to be adopted is segment p1-p2.

It should be noted that after the profiles are extracted, boundaries of the obstacles are determined. For example, the locations of the boundaries w1 to w4 of the obstacles shown in FIG. 4a are determined. The location of each trajectory point is also determined. The selectable directions are determined. Then the length of each selectable segment may be calculated based on the determined parameters.

After determining the segment to be adopted, a middle point of the segment to be adopted may be determined as a candidate point. For example, as shown in FIG. 4a, the segment to be adopted is segment p1-p2. The middle point C1 of the segment p1-p2 may be a candidate point.

It should be noted that the number of the selectable segments is set in the above embodiment. That is, the number of selectable segments is determined. The shortest segment is the shortest in the selectable segments. Because the selectable directions do not include all of the directions, the shortest segment may not be the actual shortest segment in all of the directions. In other embodiments, selectable segments may be determined in all directions passing the trajectory point, and the shortest segment may be selected from selectable segments in all of the directions. This shortest segment is the actual shortest segment in all directions.

S32: clustering the candidate points into a plurality of clusters and determining cluster representative points in the clusters.

The candidate points may be clustered based on clustering rules. The cluster representative points in the clusters may be determined based on cluster representative point selection rules. The clustering rules and the cluster representative point selection rules may be set based on actual needs.

In some embodiments, the clustering rules may include:

for two candidate points, if a distance between the two candidate points is smaller than a sum of radii corresponding to the two candidate points, clustering the two candidate points in a same cluster; otherwise, clustering them in different clusters. A radius corresponding to a candidate points is one half of a length of the shortest segment where the candidate point is located. For example, for the candidate point C1 in FIG. 4a, the shortest segment where the candidate point C1 is located is segment p1-p2. The radius corresponding to the candidate point C1 is one half of the length of segment p1-p2. In the above embodiment, because C1 is the middle point of the shortest segment p1-p2, the radius corresponding to the candidate point C1 is also the distance from the candidate point C1 to point p1, or from C1 to point p2.

In some embodiments, the cluster representative point selection rules may include:

in each cluster, determining the candidate point corresponding to the smallest radius as the cluster representative point of the corresponding cluster. It should be understood that equivalent to the radius, the diameter of the candidate point may be used. The candidate having the smallest diameter may be determined as the cluster representative point of the corresponding cluster. The diameter of the candidate point refers to the length of the shortest segment where the candidate point is located.

For example, referring to FIG. 4b, assuming that the distance between the candidate points 68 and 72 is $D_{68-72}$, the radius corresponding to the candidate points 68 and 72 is $R_{68}$ and $R_{72}$, respectively. If $D_{68-72} > R_6 + R_{72}$, then the candidate points 68 and 72 belong to two clusters. If $D_{68-72} < R_{68} + R_{72}$, then the candidate points 68 and 72 belong to a same cluster. If assuming a same cluster includes only two candidate points 68 and 72, and if $R_{68} < R_{72}$, then the candidate point 68 may be determined as the cluster representative point for the corresponding cluster.

As another example, referring to FIG. 4b, a mobile device 10 may start from the left lower corner in the figure, move from left to right, from bottom to top, along an inner boundary of the map of the closed space. The black dot in the figure represents a trajectory point. The dashed line passing the black dot represents a shortest segment passing the trajectory point. According to the above definition of a "candidate point," then the white dot between the dashed lines represents a possible candidate point. Using the above "distance range rules" for filtering the candidate points, the middle points on the dashed lines may be categorized into candidate points represented by white dots and candidate points to be removed that are represented by white squares. That is, the shortest segments where the white dots (e.g., 62, 63, etc.) are located are within the predetermined length range, and the shortest segments white squares (e.g., 61, 65, etc.) where the white squares are located are out of the predetermined length range.

Using the points between the south side (bottom side) of an inner wall 53 and an outer wall as examples: first, because the shortest segment where the trajectory point 11 is located and the shortest segment where the trajectory point 15 is located are out of the predetermined length range, the corresponding white squares 61 and 65 are removed. Thus, the cluster only includes trajectory points 12-14. Then, the lengths of the shortest segments corresponding to the trajectory points 12, 13, and 14 are compared. The shortest segment of the trajectory point/candidate point may be represented by LS. For example, the length of the shortest segment corresponding to the trajectory point 12 may be represented by $LS_{12}$, and the length of the shortest segment corresponding to the candidate point 62 may be represented as $LS_{62}$. Because the trajectory point 12 and the candidate point 62 have the same shortest segment, $LS_{12}=LS_{62}$. Because $LS_{62}>LS_{63}=LS_{64}$, the candidate point 63 or 64 may be selected to represent the cluster. For example, only the candidate point 63 may be reserved, and the candidate points 62 and 64 corresponding to the trajectory points 12 and 14 are removed. The candidate point 63 may replace the trajectory point 13. Therefore, only the candidate point 63 may be reserved as the cluster representative point to represent the cluster.

S33: filtering the cluster representative points to determine candidate doors.

The cluster representative points may be filtered based on cluster representative point filtering rules, and candidate doors may be determined. The cluster representative point filtering rules may be set based on actual needs.

In some embodiments, the cluster representative point filtering rules include: filtering based on door determination criterion, reserving cluster representative points that satisfy the door determination criterion, and removing cluster representative points that do not satisfy the door determination criterion.

The door determination criterion may include:
determining selection zones where the cluster representative points are located;
selecting one or more points within the selection zones, for each selected point, drawing a straight line passing the selected point and extending in parallel with a shortest segment on which a cluster representative point is located, and calculating metric values of crossing points between the straight line and boundaries of obstacles located at two sides of the selected point.
constructing a graph based on the one or more selected points from the selection zone, wherein the constructed graph includes at least two dimensions including a first dimension and a second dimension, the first dimension (e.g., a y-axis in the constructed graph) is a dimension where the metric values belong to, the second dimension (e.g., an x-axis in the constructed graph) is a dimension where projected distance values belong to, each of the projected distance values is a component of a distance value between each selected point and the cluster representative point in a direction perpendicular to a metric value direction.
determining a door corresponding to the cluster representative point as a candidate door if the projected distance values and the corresponding metric values between the cluster representative point and the one or more selected points have a proportional relationship; removing the cluster representative point if the projected distance values and the corresponding metric values between the cluster representative point and the one or more selected points do not have a proportional relationship; wherein the proportional relationship refers to, that in the constructed graph, as the projected distance values between the cluster representative point and the one or more selected points decrease (i.e., as the selected one or more points get closer to the cluster representative point along the second dimension), a metric value of a corresponding selected point in the first dimension remains unchanged or decreases In some embodiments, the selection zones may be determined in the following manner: determining a selection zone rectangle using the cluster representative point as a center, using N times of a length of the shortest segment on which the cluster representative point is located as a width, using the metric value direction as a width direction, using M times of the length of the shortest segment on which the cluster representative point is located as a longitudinal distance, and using the second dimension as a longitudinal direction, wherein, N and M are predetermined values, and N is smaller than or equal to M.

Correspondingly, the one or more points may be selected from the selection zones and the metric values may be determined in the following manner:
selecting the one or more points in the longitudinal direction that is parallel with the selection zone rectangle, for each selected point, drawing a straight line passing the selected point and extending in parallel with a shortest segment on which a cluster representative point is located, and calculating metric values of crossing points between the straight line and boundaries of obstacles located at two sides of the selected point. Alternatively, the one or more points may be selected within the selection zone rectangle.

After selecting the one or more points, the constructed graph may be a two-dimensional graph, a three-dimensional graph, or a graph of even higher dimension. Using the two dimensions as an example, the graph may be constructed as follows:
constructing a two-dimensional graph based on horizontal and vertical coordinate axes that are in directions parallel with the longitudinal direction and the width direction of the selection zone rectangle respectively; wherein, horizontal coordinates and vertical coordinates in the two-dimensional graph are the projected distance values and the metric values corresponding to the selected points, respectively.
correspondingly, reserving the cluster representative point and determining a door corresponding to the cluster representative point as a candidate door if the two-dimensional graph is a valley shape graph; otherwise, removing the cluster representative point.

Figure 5A:
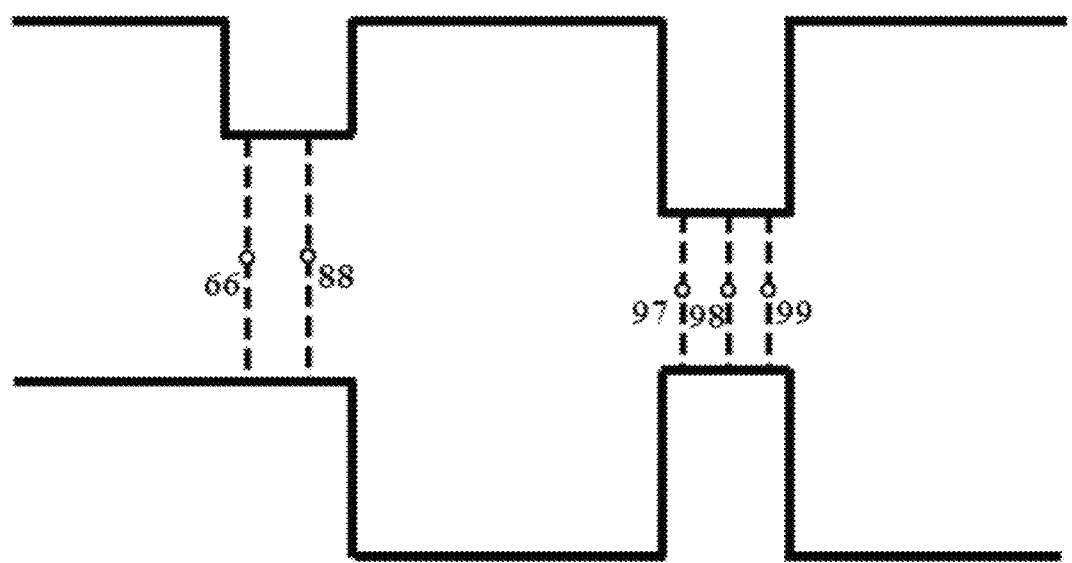
FIG. 5a to FIG. 5d are schematic illustration of filtering the cluster representative points to obtain candidate doors, according to an embodiment of the present invention.

The valley shape graph means that the closer the selected point is to the cluster representative point on the second dimension (i.e., the smaller the projected distance value of the selected point from the cluster representative point), the metric value remain unchanged or becomes smaller. That is, in the valley shape graph, the selected point and the cluster representative point satisfies the proportional relationship between the projected distance value of the selected point and the metric value. When this condition is satisfied, the door corresponding to the cluster representative point is a candidate door. Next, the two-dimensional space is used as an example in the following descriptions:

For example, referring to FIG. 5*a*, it is assumed that the candidate points 66 and 68 belong to a same cluster, and candidate points 97, 98, and 99 belong to a same cluster.

Figure 5B:
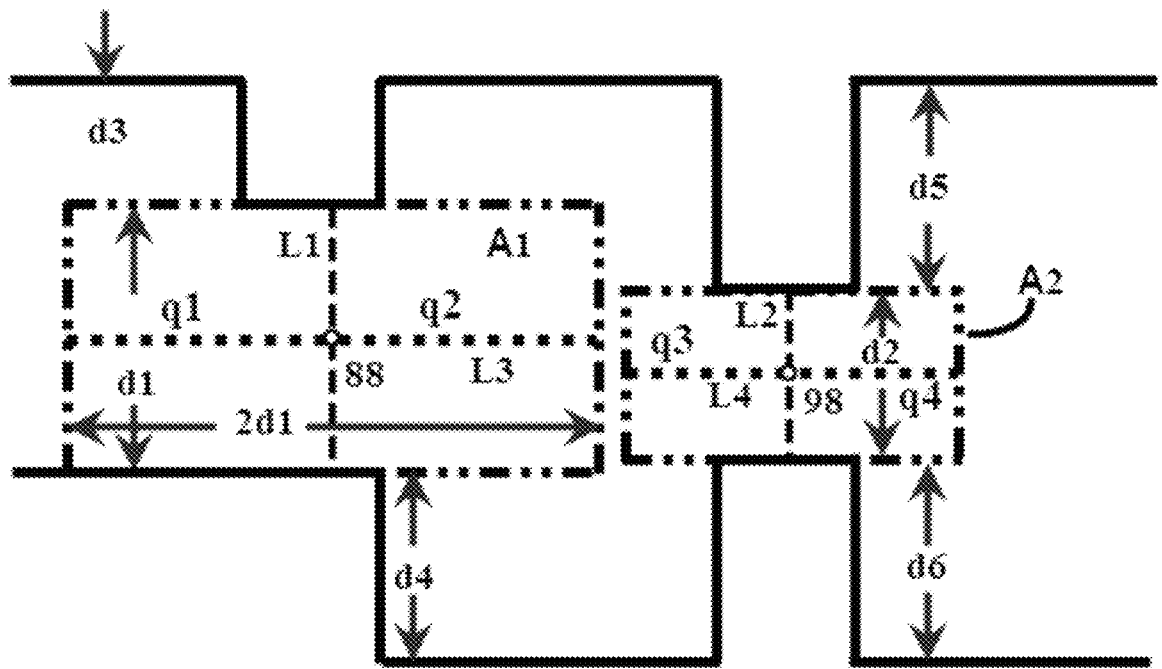
Figure 5C:
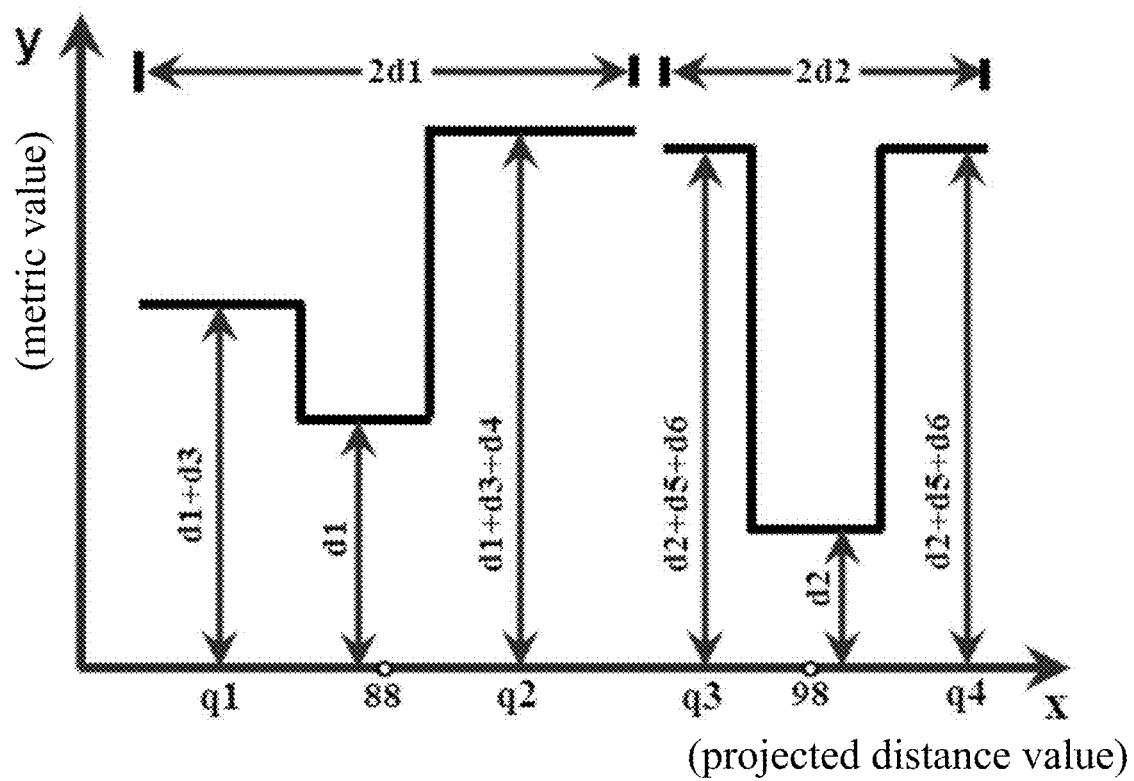
Figure 5D:
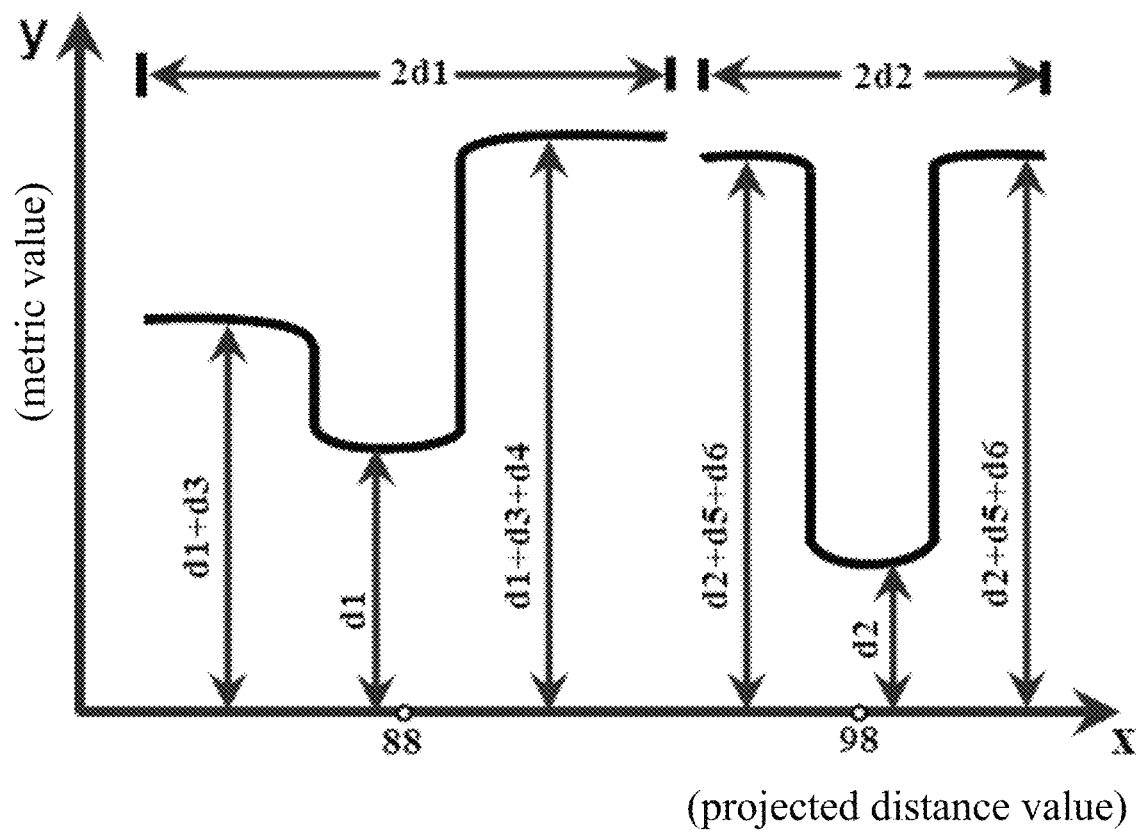
Figure 6:
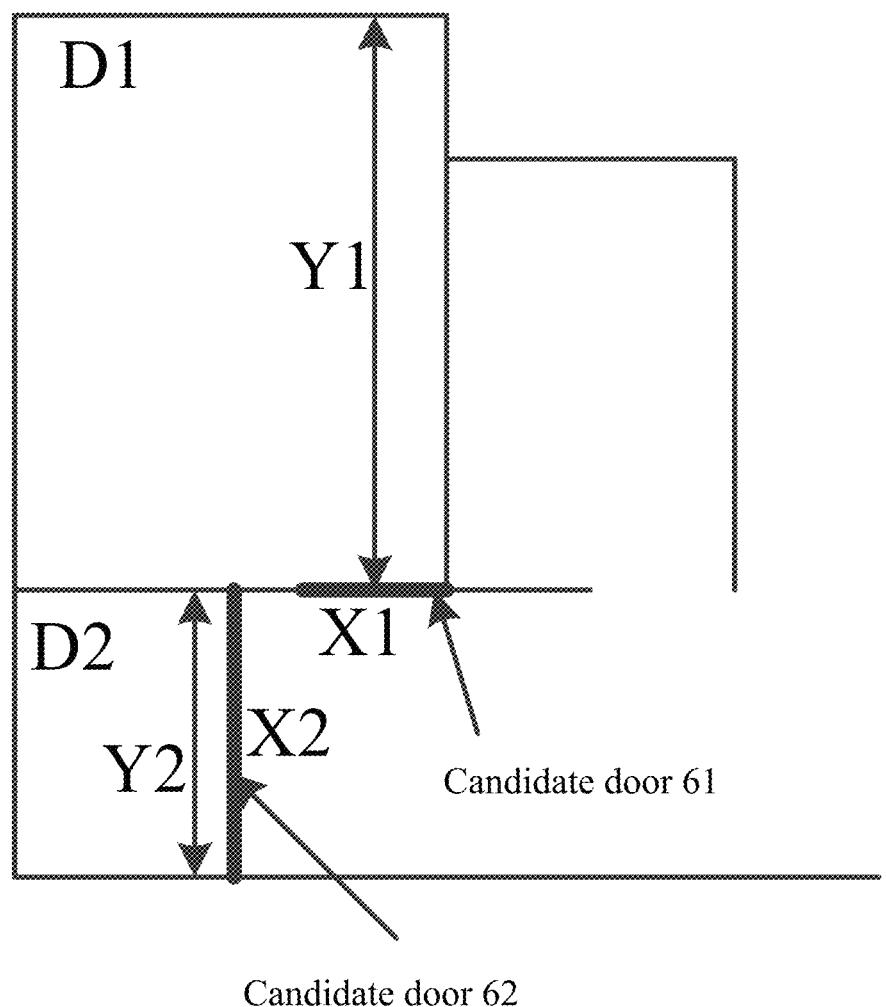
FIG. 6 is a schematic illustration of filtering the candidate doors to determine a reasonable door, according to an embodiment of the present invention.

Referring to FIGS. 5*b*-5*d*, it is assumed that the cluster representative points are the candidate points 88 and 98, respectively, N and M are selected to be 1 and 2, respectively. The shortest segments where the two candidate points 88 and 98 are located are designated by L1 and L2 respectively. The lengths of the shortest segments are represented by d1 and d2 respectively. A selection zone rectangle A1 having the candidate point 88 as the center may be obtained, and a selection zone rectangle A2 having the candidate point 98 as the center may be obtained.

The L3 and L4 represent the longitudinal directions of the selection zone rectangles, respectively. One or more points may be respectively selected in a direction parallel with the L3 and L4. A straight line may be drawn passing each selected point and extending in parallel with L1 and L2. Metric values of the crossing points between each straight line and boundaries of obstacles located at two sides of the selected point may be calculated.

In some embodiments, the metric values may be the distances between the crossing points formed by the straight line and the boundaries of obstacles located at two sides of the selected point. For example, referring to FIGS. 5b-5d, for the selected points corresponding to the selection zone rectangle A1, in the order of from left to right, the metric values are d1+d3, d1, d1+d3+d4, respectively.

It should be noted that the metric value is not limited to being the distance value between the crossing points formed by the straight line and the boundaries of the obstacles located at two sides of the selected point. The metric value may be any other suitable value. For example, in some embodiments, the metric value may be: a sum of distances from any number of points on a straight line passing a selected point and extending in a direction parallel with L1 shown in FIG. 5b to the boundaries of the obstacles located at two sides of the selected point. For example, 10 points may be selected on the segment L1. The sum of the distances from these points to the boundaries of the obstacles located at the upper and lower sides of the points may be used as the metric value of the point 88.

In some embodiments, corresponding to the coordinates and metric value of each cluster representative point or candidate point, a two-dimensional graph as shown in FIG. 5c may be constructed. Referring to FIGS. 5c and 5d, the metric value direction, i.e., the direction of segment L1, is the first dimension of the two-dimensional graph, i.e., the y-axis. The dimension perpendicular to the metric value direction, i.e., the dimension in the direction of segment L1, is the second dimension of the two-dimensional graph, i.e., the x-axis. Using the selection zone rectangle A1 in FIG. 5b as a selection zone, one or more points may be selected from the selection zone A1, such as selected points q1 and q2. As shown in FIGS. 5b-5d, the metric value of the candidate point 88 may be d1. The metric values of the selected points q1 and q2 that are relatively far away from the candidate point 88 and within A1 may be d1+d3 and d1+d3+d4, respectively, which are both greater than d1. Then the two-dimensional graph is a valley shape graph. That is, in the graph, the metric values of the selected points in the vicinity of the cluster representative point or candidate point are smaller than or equal to metric values of selected points farther away from the cluster representative point or candidate point in a direction perpendicular to the metric value direction. This indicates that the cluster representative points or the candidate point and/or adjacent locations are located within a relatively narrow zone in the selection rectangle A1, which probably corresponds to an actual door in the map of the closed space. Therefore, the candidate point 88 is reserved. The possible door corresponding to the candidate point 88 may be the shortest segment L1 where the candidate point 88 is located. Then the shortest segment L1 may be a candidate door. Similarly, the candidate point 98 shown in FIG. 5c also satisfies the door determination criterion. The shortest segment L2 where the candidate point 98 is located is also a candidate door. Similarly, if the constructed two-dimensional graph is as shown in FIG. 5d, then in this graph, the door determination criterion is also satisfied. The possible doors represented by the candidate points 88 and 98 may be treated as the candidate doors.

It should be noted that although the two-dimensional space is used as an example in the above descriptions, the constructed graph is not limited to be a two-dimensional graph, and may be a three-dimensional graph or a graph of even higher dimension. For example, a three-dimensional graph may be constructed. The values corresponding to the three dimensions of the three-dimensional graph may be: metric value, and two-dimensional coordinates of locations in the two-dimensional map. In the constructed three-dimensional graph, if the cluster representative point is a saddle point, i.e., the proportional relationship between the distance value and the metric value is satisfied, then the door corresponding to the cluster representative point is a candidate door. In some embodiments, the constructed graph may be a four-dimensional graph. For example, the four-dimensional graph may be constructed based on the three-dimensional spatial coordinates sand a one-dimensional metric value. The three-dimensional spatial coordinates include two-dimensional horizontal coordinates and one-dimensional elevation coordinates. If the projected distance from the selected point to the cluster representative point in the elevation coordinate and the metric value of the selected point have the above-described proportional relationship, the elevation coordinate of the cluster representative point may possibly indicate that the distance from the top edge of the door to the floor is smaller than the distance from the ceiling to the floor at both sides of the door frame. This door may be a candidate door.

In some embodiments, the candidate door obtained through the above method may not correspond to an actual door in the actual closed space. Thus, in some embodiments, the candidate doors may be filtered through the following steps to remove unreasonable candidate doors.

S34: filtering the candidate doors to obtain reasonable doors.

In some embodiments, for each candidate door, obtaining an area of a closed zone corresponding to the candidate door, and a length ratio between a length of the closed zone in a predetermine direction and a length of the candidate door; and reserving the candidate door as a reasonable door if the area is within a predetermined area range, and if the length ratio is within a predetermined length ratio range; otherwise, removing the candidate door.

In some embodiments, the closed zone corresponding to the candidate door refers to a closed zone formed by the candidate door and boundaries in the map that are closest to the candidate door. The predetermined direction may be, e.g., a long-axis direction of the closed zone. For example, referring to FIG. 6, the candidate doors are represented by 61 and 62. The lengths of the candidate doors are represented by X1 and X2, respectively. The closed zones formed by the candidate doors and their closes boundaries are represented by D1 and D2, respectively. The areas of the closed zones D1 and D2 are represented by S1 and S2, respectively. The length in the long-axis direction of the closed zones D1 and D2 are represented by Y1 and Y2, respectively. Corresponding to the candidate door 61, if S1 is within a predetermined area range, and the ratio between the length Y1 in the predetermined direction of the closed zone D1 and the length X1 of the candidate door, Y1/X1, is within the predetermined length ratio range (a predetermined length ratio may be greater than 2), then the candidate door 61 is a reasonable door. Otherwise, if S1 is not within the predetermined area range, and/or, Y1/X1 is outside of the predetermined length ratio range, then the candidate door 61 is an unreasonable door. The candidate door 61 may be removed. Similar determination may be applied to the candidate door 62. That is, when S2 is within the predetermined area range, and Y2/X2 is within the predetermined length ratio range, the candidate door 62 is a reasonable door.

In some embodiments, there may be error in the map. Even with the above processes, the mobile device may still mistakenly "think" that there is a reasonable door or candidate door at a place where there is no door in the actual map. In such situations, the fake door may be removed through the following zone fusion.

S35: fusing zones divided by reasonable doors, and determining a correct door.

The zone fusion process may include:

for each reasonable door, obtaining two zones connected by the reasonable door as a first candidate zone and a second candidate zone;

determining a first segment and a second segment in the first candidate zone and the second candidate zone, respectively, wherein the first segment is a segment formed by a middle point of the reasonable door and a first crossing point, the second segment is a segment formed by the middle point of the reasonable door and a second crossing point, the first crossing point is a farthest crossing point between a first ray and the first candidate zone in a direction perpendicular to the reasonable door, the second crossing point is a farthest crossing point between a second ray and the second candidate zone in the direction perpendicular to the reasonable door, the first ray is a ray starting from the middle point of the reasonable door and extending toward the first candidate zone in a direction perpendicular to the reasonable door, the second ray is a ray starting from the middle point of the reasonable door and extending toward the second candidate zone in the direction perpendicular to the reasonable door;

selecting a same number of sparse points on the first segment and the second segment, and calculating a distance value corresponding to each sparse point, wherein the distance value corresponding to each sparse point includes: a first distance value and a second distance value; the first distance value is a distance value from the sparse point to a crossing point at a first side of the sparse point between a straight line passing the sparse point and extending in parallel with the reasonable door, and a boundary of a candidate zone in which the sparse point is located; the second distance value is a distance value from the sparse point to a crossing point at a second side of the sparse point between the straight line passing the sparse point and extending in parallel with the reasonable door and a boundary of the candidate zone in which the sparse point is located, the first side and the second side of the sparse point are two direction of the straight line passing the sparse point and extending in parallel with the reasonable door relative to the sparse point;

calculating a variance based on distance values corresponding to all sparse points (i.e., all sparse points on the first segment and the second segment) within the first candidate zone and the second candidate zone; reserving the reasonable door as the correct door if the variance is greater than a predetermined value, or fusing the first candidate zone and the second candidate zone into a same zone if the variance is smaller than or equal to the predetermined value.

Figure 7:
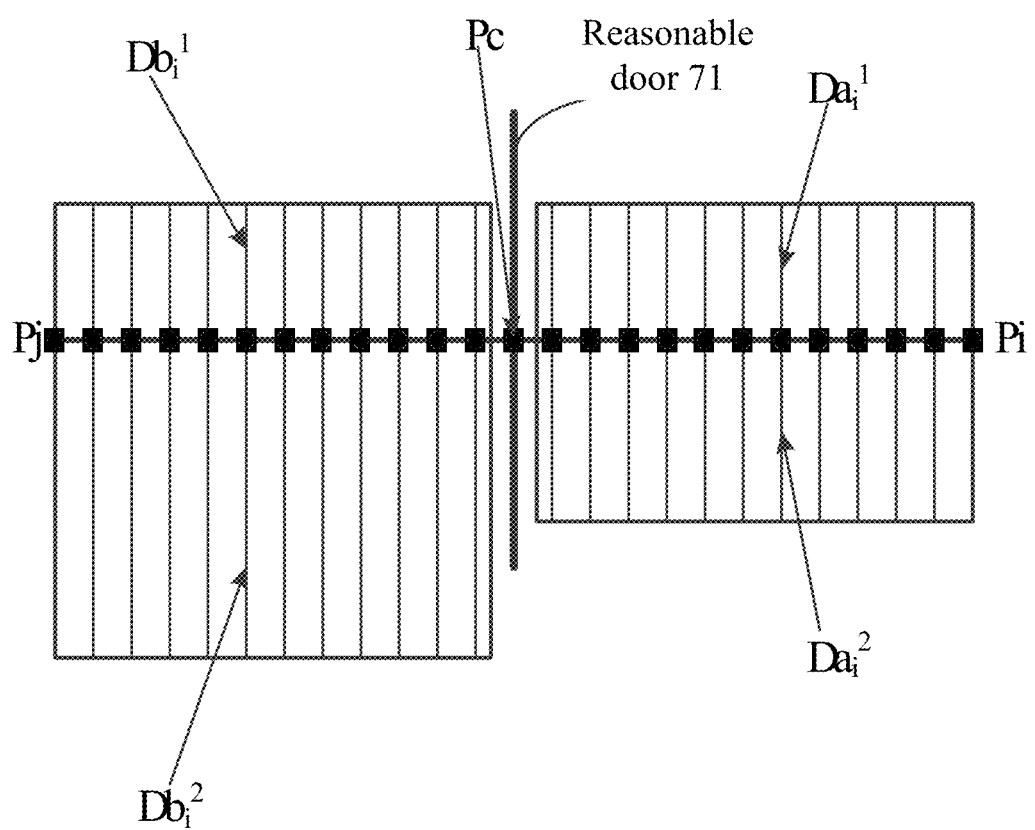
FIG. 7 is a schematic illustration of performing zone fusion on the reasonable door to determine a correct door, according to an embodiment of the present invention.

For example, referring to FIG. 7, the right side of the reasonable door 71 is the first candidate zone, the left side is the second candidate zone. The middle point of the reasonable door 71 is Pc. The first crossing point and the second crossing point are Pi and Pj, respectively. The first segment and the second segment are segment Pc-Pi and Pc-Pj, respectively. As shown in FIG. 7, assuming 12 equally-spaced sparse points are selected on the first segment and the second segment based on the sizes of the first candidate zone and the second candidate zone, then the distance value corresponding to each sparse point may include distances from the sparse point to the crossing points at the first side and the second side of the sparse point (corresponding to the top and bottom sides of the sparse point in FIG. 7), wherein the crossing points are formed by the straight line passing each sparse point and extending in parallel with the reasonable door and boundaries of the candidate zone in which the sparse point is located. Assuming the distance values of the 12 sparse points on the right side are $Da_i^1$ and $Da_i^2$ (i=1, 2, ..., 12), the distance values of the 12 sparse points on the left side are $Db_i^1$ and $Db_i^2$ (i=1, 2, ..., 12), then a total of 48 distance values may be obtained. The variance of the 48 distance values may be calculated.

If the variance is greater than a predetermined value (e.g., 3000), the reasonable door 71 may be a correct door; otherwise, if the variance is smaller than the predetermined value, it indicates that the zones at both sides are substantially the same, and may be regarded as a same zone. The reasonable door 71 may be removed, such that the first candidate zone and the second candidate zone are fused into one zone.

Figure 8A:
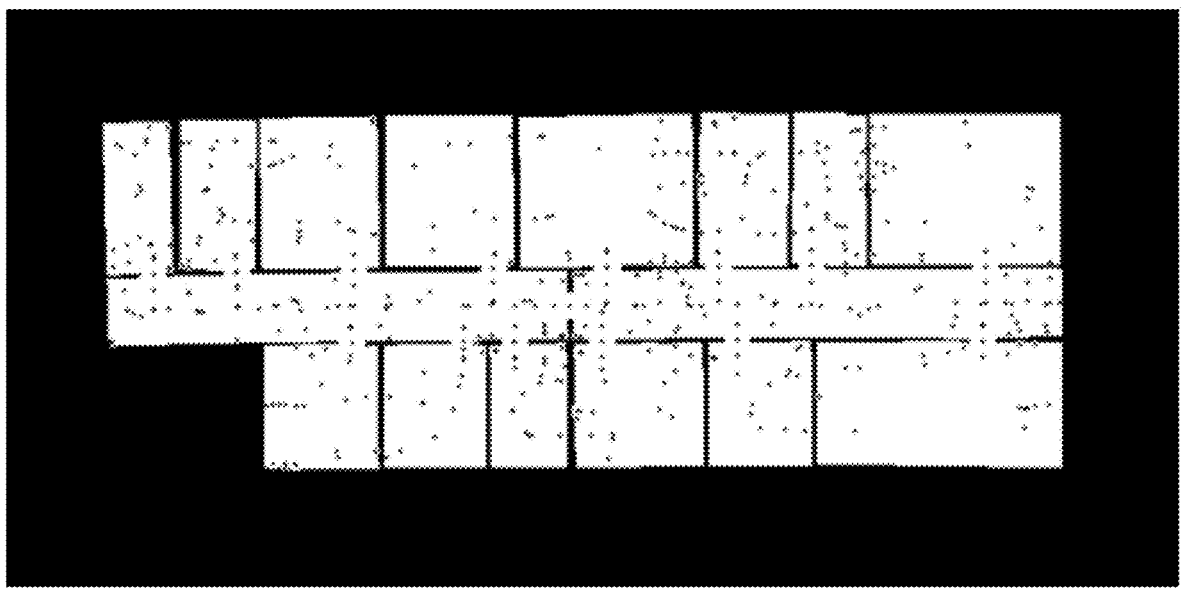
FIG. 8a to FIG. 8g are simulation graphs illustrating from determining trajectory points to determining the correct door, according to an embodiment of the present invention.
Figure 8B:
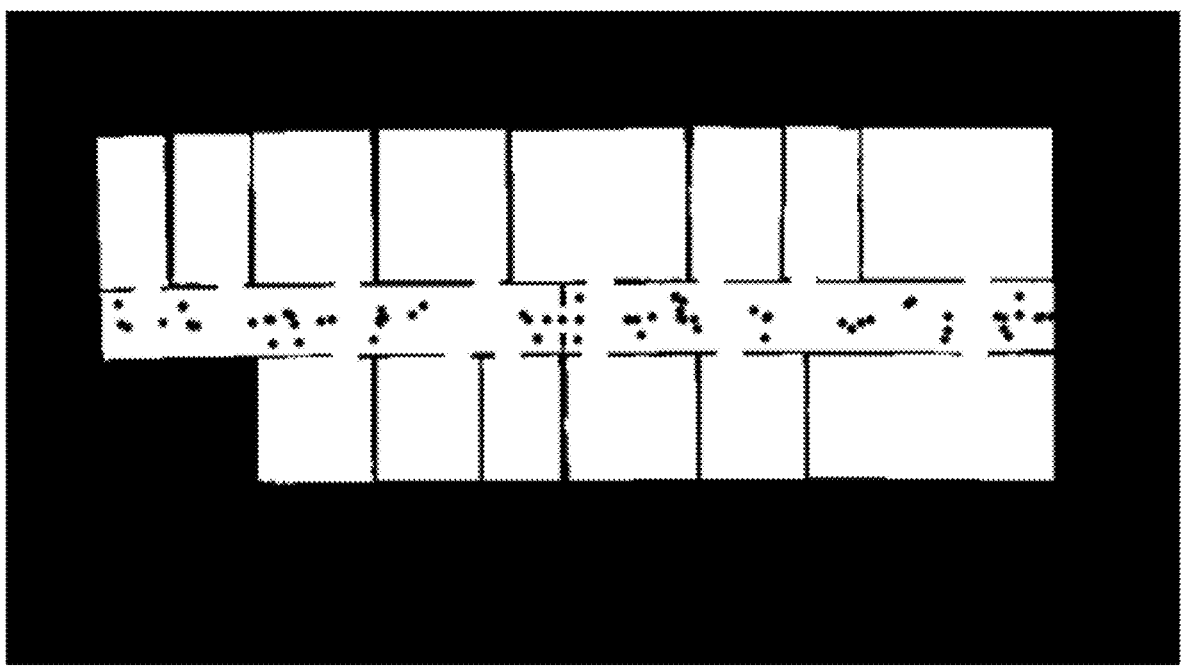
Figure 8C:
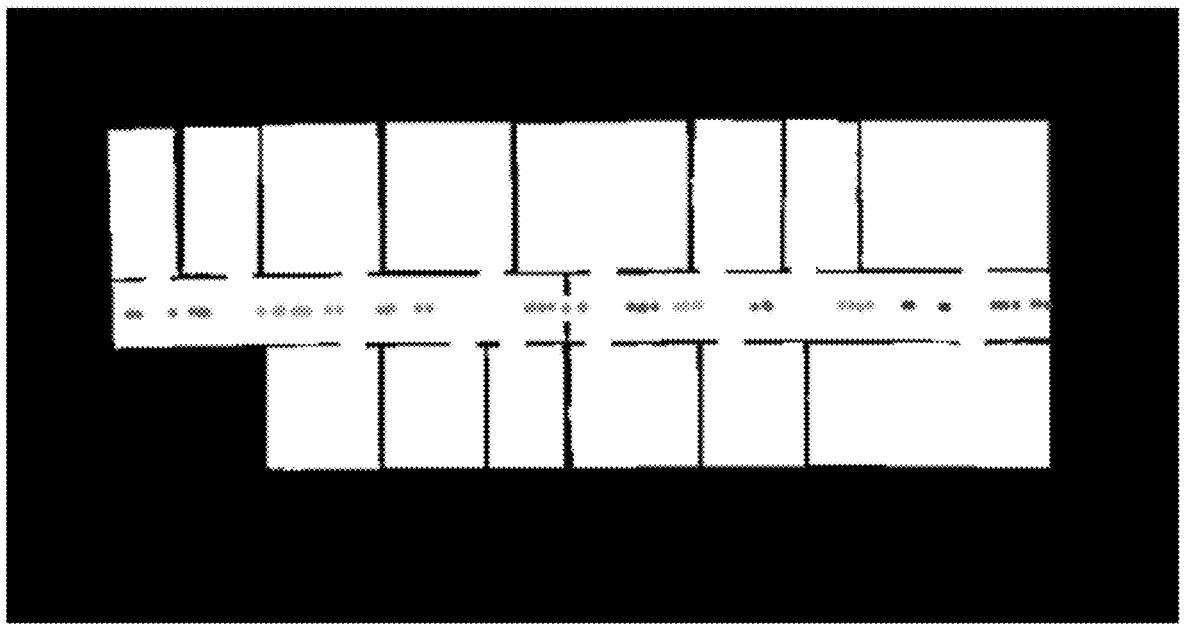
Figure 8D:
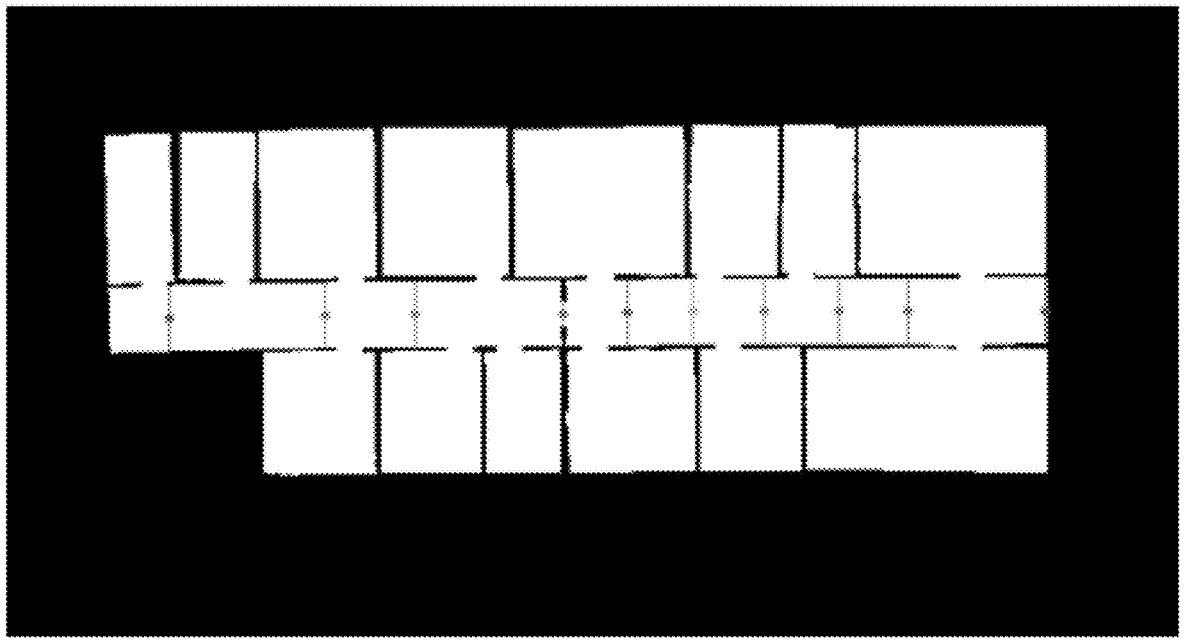
Figure 8E:
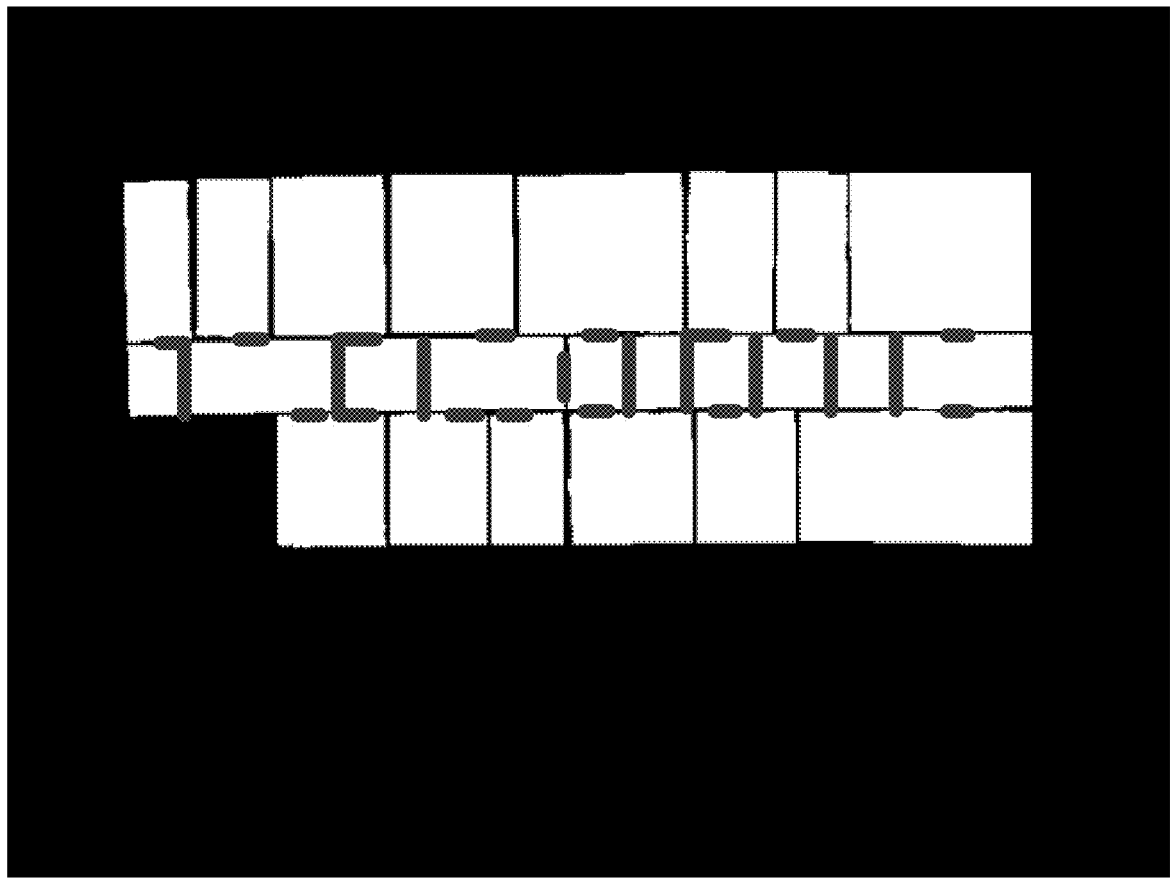
Figure 8F:
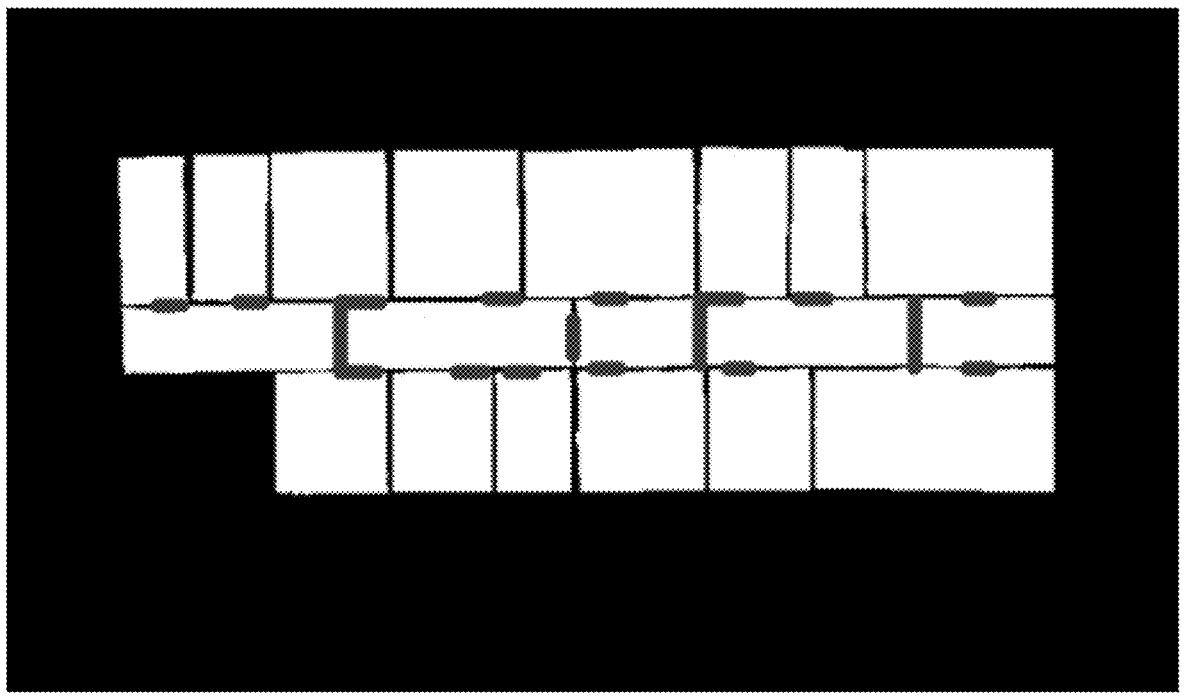
Figure 8G:

Using the zone division being the room division as an example, simulated graphs from determining the trajectory points to determining the correct door are shown in FIG. 8a-FIG. 8g. FIG. 8a shows the trajectory points in the map. The trajectory points may be actual trajectory points and/or virtual trajectory points. FIG. 8b shows candidate points obtained through filtering in the vertical direction. Filtering in the vertical direction means that the selectable direction of the straight line passing the trajectory point is the vertical direction. FIG. 8c shows candidate points after the clustering. FIG. 8d shows the cluster representative points and doors represented by the cluster representative points. The doors represented by the cluster representative points are shown as segments. FIG. 8e shows candidate doors determined after filtering the cluster representative points. Each candidate door is shown as a black thick segment. It should be understood that FIG. 8e includes candidate doors in the horizontal direction. Correspondingly, although not shown, similar to FIG. 8b, there may be candidate points in the horizontal direction after the filtering. It can be seen that the algorithm can extract the locations of all of the correct doors. But it also reserved locations of unnecessary doors. FIG. 8f schematically shows reasonable doors determined after filtering the candidate doors. It can be seen that after filtering the candidate doors, unreasonable room zones are removed. The reserved zones that are divided by the reasonable doors physically satisfy characteristics of a room, i.e., the size and structure of the room are reasonable. FIG. 8g schematically shows the determined correct door after fusing the zones. It can be seen that after fusing the rooms, redundant doors on the hallway are removed.

Figure 9:
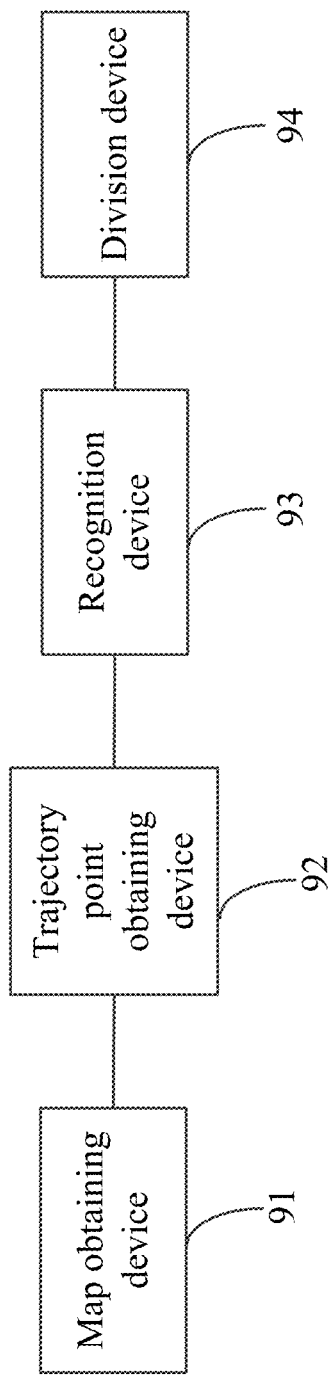
FIG. 9 is a schematic illustration of a structure of a closed space zone division apparatus, according to an embodiment of the present invention.

FIG. 9 is a schematic illustration of a structure of a closed space zone division device or apparatus, according to an embodiment of the present disclosure. As shown in FIG. 9, the device includes a map obtaining device 91, a trajectory point obtaining device 92, a recognition device 93, and a division device 94.

The map obtaining device 91 may be configured to obtain a map of the closed space.

The trajectory point obtaining device 92 may be configured to obtain trajectory points.

The recognition device 93 may be configured to process the trajectory points, and recognize a correct door in the closed space based on the map and a result of processing the trajectory points.

The division device 94 may be configured to divide the closed space based on the map and the correct door.

In some embodiments, the recognition device 93 may include:
- a candidate point determining unit configured to determine candidate points based on the trajectory points;
- a clustering unit configured to cluster the candidate points into a plurality of clusters, and to determine cluster representative points in the clusters;
- a candidate door determining unit configured to filter the cluster representative points to determine candidate doors;
- a reasonably door determining unit configured to filter the candidate doors to obtain reasonable doors;
- a zone fusing unit configured to fuse zones divided by the reasonable doors, and to filter out a correct door from the reasonable doors.

In some embodiments, the trajectory points may include: actual trajectory points and/or virtual trajectory points. The trajectory point obtaining unit may be configured to:
- obtain actual trajectory points actually traversed by the mobile device in the map of the closed space; and/or,
- generating virtual trajectory points in the map based on a predetermined virtual trajectory point generating algorithm.

In some embodiments, the candidate point determining unit may be configured to:
- for each trajectory point, determine selectable segments, wherein each selectable segment is determined as a segment formed by crossing points between a straight line passing the trajectory point and extending in a selectable direction and boundaries of obstacles located at two sides of the trajectory point;
- determine a segment to be adopted from the selectable segments;
- determine a middle point on the segment to be adopted as a candidate point.

In some embodiments, the candidate point determining unit may be configured to:
- select a shortest segment from all of the selectable segments and determine the selected shortest segment as the segment to be adopted; or,
- select the shortest segment from all of the selectable segments, and determine the selected shortest segment as the segment to be adopted if a length of the selected shortest segment is within a predetermined length range; or
- select one or more selectable segments from all of the selectable segments, a length of the one or more selected selectable segments being within the predetermined length range, and
- determine a shortest segment from the one or more selected selectable segments as the segment to be adopted.

In some embodiments, the clustering unit is configured to:
for two candidate points, if a distance between the two candidate points is smaller than a sum of radii corresponding to the two candidate points, cluster the two candidate points in a same cluster;

wherein a radius corresponding to a candidate point is one half of a length of a shortest segment on which the candidate point is located.

In some embodiments, the clustering unit is also configured to:
in each cluster, determine a candidate point that corresponds to a shortest radius as a cluster representative point for the cluster.

In some embodiments, the candidate door determining unit is configured to:
- determine selection zones where the cluster representative points are located;
- select one or more points within the selection zones;
- for each selected point, draw a straight line passing the selected point and extending in parallel with a shortest segment on which a cluster representative point is located, and calculate metric values of crossing points between the straight line and boundaries of obstacles located at two sides of the selected point;
- construct a graph based on the one or more selected points from the selection zone, wherein the constructed graph includes at least two dimensions including a first dimension and a second dimension, the first dimension is a dimension where the metric values belong to, the second dimension is a dimension where projected distance values belong to, each of the projected distance values is a component of a distance value between each selected point and the cluster representative point in a direction perpendicular to a metric value direction;
- determine a door corresponding to the cluster representative point as a candidate door if the projected distance values and the corresponding metric values between the cluster representative point and the one or more selected points have a proportional relationship; otherwise, remove the cluster representative point if the projected distance values and the corresponding metric values between the cluster representative point and the one or more selected points do not have a proportional relationship;
- wherein the proportional relationship is a relationship, in which as the projected distance values between the cluster representative point and the one or more selected points decrease, a metric value of a corresponding selected point in the first dimension remains unchanged or decreases.

In some embodiments, the door determining unit is further configured to:
for each cluster representative point, determine a selection zone rectangle using the cluster representative point as a center, using N times of a length of the shortest segment on which the cluster representative point is located as a width, using the metric value direction as a width direction, using M times of the length of the shortest segment on which the cluster representative point is located as a longitudinal distance, and using the second dimension as a longitudinal direction, wherein, N and M are predetermined values, and N is smaller than or equal to M;
- select the one or more points in the longitudinal direction that is parallel with the selection zone rectangle;
- for each selected point, draw a straight line passing the selected point and extending in parallel with a shortest segment on which a cluster representative point is located, and calculate metric values of crossing points between the straight line and boundaries of obstacles located at two sides of the selected point;
- construct a two-dimensional graph based on horizontal and vertical coordinate axes that are in directions parallel with the longitudinal direction and the width direction of the selection zone rectangle respectively;

reserve the cluster representative point and determine a door corresponding to the cluster representative point as a candidate door if the two-dimensional graph is a valley shape graph.

In some embodiments, the reasonable door determining unit is configured to:

for each candidate door, obtain an area of a closed zone corresponding to the candidate door, and a length ratio between a length of the closed zone in a predetermine direction and a length of the candidate door;

reserve the candidate door as a reasonable door if the area is within a predetermined area range, and if the length ratio is within a predetermined length ratio range.

In some embodiments, the zone fusing unit is configured to:

for each reasonable door, obtain two zones connected by the reasonable door as a first candidate zone and a second candidate zone;

determine a first segment and a second segment in the first candidate zone and the second candidate zone, respectively, wherein the first segment is a segment formed by a middle point of the reasonable door and a first crossing point, the second segment is a segment formed by the middle point of the reasonable door and a second crossing point, the first crossing point is a farthest crossing point between a first ray and the first candidate zone in a direction perpendicular to the reasonable door, the second crossing point is a farthest crossing point between a second ray and the second candidate zone in the direction perpendicular to the reasonable door, the first ray is a ray starting from the middle point of the reasonable door and extending toward the first candidate zone in a direction perpendicular to the reasonable door, the second ray is a ray starting from the middle point of the reasonable door and extending toward the second candidate zone in the direction perpendicular to the reasonable door.

select a same number of sparse points on the first segment and the second segment, and calculate a distance value corresponding to each sparse point, wherein the distance value corresponding to each sparse point includes: a first distance value and a second distance value; the first distance value is a distance value from the sparse point to a crossing point at a first side of the sparse point between a straight line passing the sparse point and extending in parallel with the reasonable door, and a boundary of a candidate zone in which the sparse point is located; the second distance value is a distance value from the sparse point to a crossing point at a second side of the sparse point between the straight line passing the sparse point and extending in parallel with the reasonable door and a boundary of the candidate zone in which the sparse point is located, the first side and the second side of the sparse point are two direction of the straight line passing the sparse point and extending in parallel with the reasonable door relative to the sparse point.

calculate a variance based on distance values corresponding to all sparse points within the first candidate zone and the second candidate zone;

reserve the reasonable door as the correct door if the variance is greater than a predetermined value, or fuse the first candidate zone and the second candidate zone into a same zone if the variance is smaller than or equal to the predetermined value.

In some embodiments, the map obtaining unit is configured to:

obtain an original map of the closed space;

process the original map to extract profiles;

filter the profiles to generate reserved profiles; and draw the map of the closed space based on reserved profiles.

In some embodiments, the apparatus also includes:

an executing device configured to: in the zones obtained through the zone division, execute the predetermined task of the mobile device in separate zones.

Figure 10:
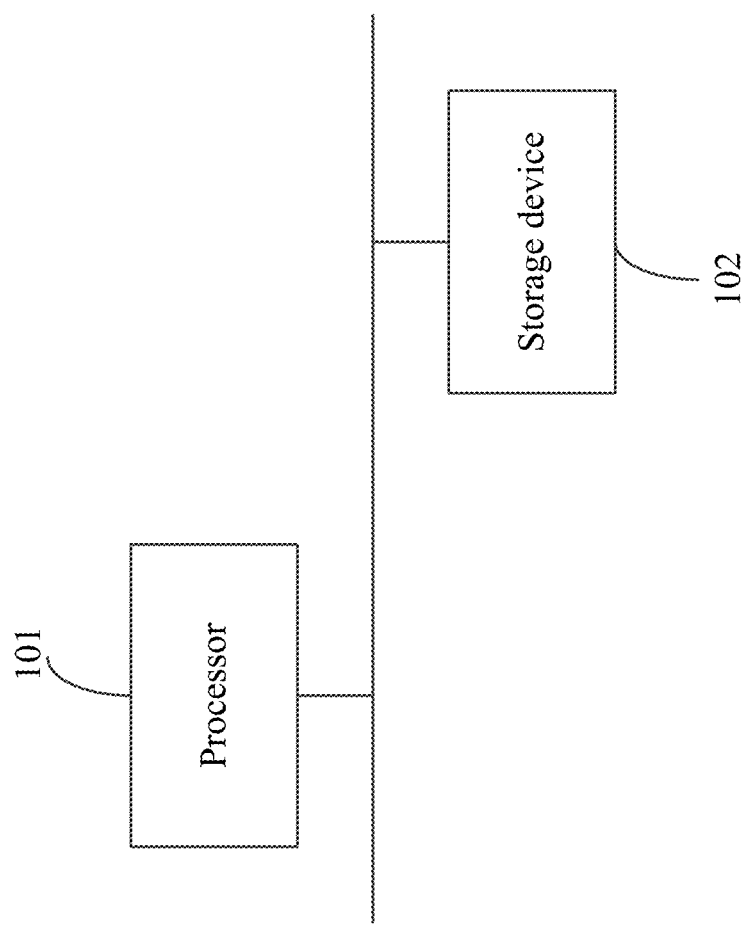
FIG. 10 is a schematic illustration of a structure of a mobile device, according to an embodiment of the present invention.

FIG. 10 is a schematic illustration of a structure of a mobile device, according to an embodiment of the present disclosure. The mobile device may include a processor 101 and a storage device 102 configured to store processor-executable instructions. The processor 101 may be configured to retrieve the processor-executable instructions from the storage device 102, and executing the instructions to perform the closed space zone division methods.

In some embodiments, the mobile device may also include: an executing device controlled by the processor to execute the predetermined task of the mobile device in separate zones within the zones obtained through the zone division.

In some embodiments, the present disclosure also provides a non-transitory computer-readable storage medium. When instructions stored in the storage medium are executed by the processor of the mobile device, the mobile device may perform the closed space zone division method described above.

Regarding the apparatus and device disclosed in the above embodiments, the detailed manner of executing operations by each unit has already been described in detail in the method embodiments. Hence, detailed descriptions are not repeated.

It should be understood that descriptions of the same or similar components in various embodiments can refer to one another. Content that has not been described in detail in some embodiments can refer to the same or similar content described in other embodiments.

It should be noted that in the present description, the terms "first," "second," are only used for descriptive purposes, and cannot be understood as indicating or implying relative importance. In addition, in the present descriptions, the term "multiple" means at least two, unless noted otherwise.

The processes or methods shown in the flow charts or otherwise described in any manner can be understood as one or more modules, segments, or parts of codes of executable instructions of steps configured to realize specific logic functions or processes. The scope of the preferred embodiments of the present invention includes other implementations. The execution of functions may not follow the illustrated or described order, but may follow an order in which the involved functions are executed in a substantially simultaneous manner or in an opposite order. This should be understood by a person having ordinary skills in the art of embodiments of the present invention.

It should be understood that the various parts of the present invention may be implemented using hardware, software, firmware, or a combination thereof. In the above embodiments, multiple steps or methods may be realized using software or firmware stored in a memory and executable by a suitable instruction-executing system. For example, if implemented using hardware, similar to another embodiment, the realization may be carried out using any of the following technologies known in the art or their combination: a discrete logic circuit of logic gate circuits configured to realize logic functions for digital signals, an application specific integrated circuit having suitable combinations of logic gate circuits, a programmable gate array (PGA), a field programmable gate array (FPGA), etc.

A person having ordinary skills in the art can appreciate that all or parts of the steps included in the method embodiments may be implemented through a program instructing related hardware. The program may be stored in a computer-readable storage medium. When the program is executed, it includes one of the steps of the disclosed methods or their combination.

In addition, various functional units of various embodiments of the present invention may be integrated in a single processing module, or each functional unit may individually and physically exist. In some embodiments, two or more units may be integrated in a single unit. The integrated unit may be realized using hardware, or may be realized using software functional modules. If the integrated module is realized using software functional modules and sold or used as an independent product, it may also be stored in a computer-readable storage medium.

The storage medium mentioned above may be a read-only memory, a magnetic disk, or an optical disk, etc.

In the present description, descriptions of reference terms such as "an embodiment," "some embodiments," "example," "specific example," or "some examples," mean that specific characteristics, structures, materials, or features described in the embodiment or example are included in at least one embodiment or example of the present invention. In the present description, illustrative expression of the above terms does not necessarily mean the same embodiment or example. Further, specific characteristics, structures, materials, or features may be combined in one or multiple embodiments or examples in a suitable manner.

The above illustrates and describes various embodiments of the present invention. It is understood that these embodiments are illustrative, and should not be construed to limit the scope of the present invention. A person having ordinary skills in the art can change, modify, replace, or vary the above embodiments within the scope of the present invention.

The invention claimed is:

1. A method executable by a processor included in an autonomous mobile device, comprising:
   obtaining, by the processor, a map of a closed space;
   obtaining, by the processor, trajectory points;
   processing, by the processor, the trajectory points, and recognizing, by the processor, a correct door in the closed space based on the map and a result of processing the trajectory points; and
   dividing, by the processor, the closed space into zones based on the correct door and the map,
   wherein processing, by the processor, the trajectory points and recognizing, by the processor, the correct door in the closed space based on the map and the result of processing the trajectory points, comprises:
      determining, by the processor, candidate points based on the trajectory points;
      clustering, by the processor, the candidate points into a plurality of clusters and determining, by the processor, cluster representative points in the clusters;
      filtering, by the processor, the cluster representative points to determine candidate doors;
      filtering, by the processor, the candidate doors to determine reasonable doors;
      fusing, by the processor, zones divided by the reasonable doors, and filtering, by the processor, the reasonable doors to obtain the correct door,
   wherein for each candidate door, an area of a closed zone corresponding to the candidate door is obtained, and a length ratio between a length of the closed zone in a predetermine direction and a length of the candidate door is obtained, and
   wherein a reasonable door is a candidate door having the area within a predetermined area range and having the length ratio within a predetermined length ratio range.

2. The method of claim 1, wherein:
   the trajectory points include: actual trajectory points and/or virtual trajectory points, obtaining, by the processor, the trajectory points includes:
      obtaining, by the processor, the actual trajectory points traversed by a mobile device in the closed space; and/or
      generating, by the processor, the virtual trajectory points in the map of the closed space based on a predetermined virtual trajectory point generating algorithm.

3. The method of claim 1, wherein obtaining, by the processor, the map of the closed space comprises:
   obtaining, by the processor, an original map of the closed space;
   processing, by the processor, the original map to extract profiles;
   filtering, by the processor, the profiles to generate reserved profiles; and
   drawing, by the processor, the map of the closed space based on the reserved profiles.

4. The method of claim 1, wherein determining, by the processor, the candidate points based on the trajectory points comprises:
   for each trajectory point, determining, by the processor, selectable segments, wherein each selectable segment is determined as a segment formed by crossing points between a straight line passing the trajectory point and extending in a selectable direction and boundaries of obstacles located at two sides of the trajectory point;
   determining, by the processor, a segment to be adopted from the selectable segments; and
   determining, by the processor, a middle point on the segment to be adopted as a candidate point.

5. The method of claim 4, wherein determining, by the processor, the segment to be adopted from the selectable segments comprises:
   selecting, by the processor, a shortest segment from all of the selectable segments and determining, by the processor, the selected shortest segment as the segment to be adopted; or
   selecting, by the processor, the shortest segment from all of the selectable segments, and determining, by the processor, the selected shortest segment as the segment to be adopted when a length of the selected shortest segment is within a predetermined length range; or
   selecting, by the processor, one or more selectable segments from all of the selectable segments, a length of the one or more selected selectable segments being within the predetermined length range, and determining, by the processor, a shortest segment from the one or more selected selectable segments as the segment to be adopted.

6. The method of claim 1, wherein clustering, by the processor, the candidate points comprises:

for two candidate points, when a distance between the two candidate points is smaller than a sum of radii corresponding to the two candidate points, clustering, by the processor, the two candidate points in a same cluster,
wherein a radius corresponding to a candidate point is one half of a length of a shortest segment on which the candidate point is located.

7. The method of claim 1, wherein determining, by the processor, the cluster representative points in the clusters comprises:
in each cluster, determining, by the processor, a candidate point that corresponds to a shortest radius as a cluster representative point for the cluster.

8. The method of claim 1, wherein filtering, by the processor, the cluster representative points to determine candidate doors comprises:
determining, by the processor, selection zones where the cluster representative points are located;
selecting, by the processor, one or more points within the selection zones;
for each selected point, drawing, by the processor, a straight line passing the selected point and extending in parallel with a shortest segment on which a cluster representative point is located, and calculating, by the processor, a metric value of crossing points between the straight line and boundaries of obstacles located at two sides of the selected point.

9. The method of claim 8, further comprising:
constructing, by the processor, a graph based on the one or more selected points from the selection zone, wherein the constructed graph includes at least two dimensions including a first dimension and a second dimension, the first dimension is a dimension where the metric values belong to, the second dimension is a dimension where projected distance values belong to, each of the projected distance values is a component of a distance value between each selected point and the cluster representative point in a direction perpendicular to a metric value direction.

10. The method of claim 9, further comprising:
determining, by the processor, a door corresponding to the cluster representative point as a candidate door when the projected distance values and the corresponding metric values between the cluster representative point and the one or more selected points have a proportional relationship; and
removing, by the processor, the cluster representative point when the projected distance values and the corresponding metric values between the cluster representative point and the one or more selected points do not have a proportional relationship,
wherein the proportional relationship is a relationship, in which as the projected distance values between the cluster representative point and the one or more selected points decrease, a metric value of a corresponding selected point in the first dimension remains unchanged or decreases.

11. The method of claim 8, wherein determining, by the processor, the selection zones where the cluster representative points are located comprises:
for each cluster representative point, determining, by the processor, a selection zone rectangle using the cluster representative point as a center, using N times of a length of the shortest segment on which the cluster representative point is located as a width, using the metric value direction as a width direction, using M times of the length of the shortest segment on which the cluster representative point is located as a longitudinal distance, and using the second dimension as a longitudinal direction, wherein, N and M are predetermined values, and N is smaller than or equal to M.

12. The method of claim 11, wherein selecting, by the processor, one or more points within the selection zones comprises:
selecting, by the processor, the one or more points in the longitudinal direction that is parallel with the selection zone rectangle, or selecting, by the processor, the one or more points within the selection zone rectangle.

13. The method of claim 11, wherein constructing, by the processor, the graph based on the one or more selected points from the selection zone comprises:
constructing, by the processor, a two-dimensional graph based on horizontal and vertical coordinate axes that are in directions parallel with the longitudinal direction and the width direction of the selection zone rectangle respectively,
wherein, horizontal coordinates and vertical coordinates in the two-dimensional graph are the projected distance values and the metric values corresponding to the selected points, respectively.

14. The method of claim 13, wherein determining, by the processor, a door corresponding to the cluster representative point as the candidate door when the projected distance values and the corresponding metric values between the cluster representative point and the one or more selected points have the proportional relationship, comprises:
reserving, by the processor, the cluster representative point and determining, by the processor, a door corresponding to the cluster representative point as a candidate door when the two-dimensional graph is a valley shape graph.

15. The method of claim 1, wherein fusing, by the processor, zones divided by the candidate doors, and filtering, by the processor, the reasonable doors to obtain the correct door comprises:
for each reasonable door, obtaining, by the processor, two zones connected by the reasonable door as a first candidate zone and a second candidate zone;
determining, by the processor, a first segment and a second segment in the first candidate zone and the second candidate zone, respectively, wherein the first segment is a segment formed by a middle point of the reasonable door and a first crossing point, the second segment is a segment formed by the middle point of the reasonable door and a second crossing point, the first crossing point is a farthest crossing point between a first ray and the first candidate zone in a direction perpendicular to the reasonable door, the second crossing point is a farthest crossing point between a second ray and the second candidate zone in the direction perpendicular to the reasonable door, the first ray is a ray starting from the middle point of the reasonable door and extending toward the first candidate zone in a direction perpendicular to the reasonable door, the second ray is a ray starting from the middle point of the reasonable door and extending toward the second candidate zone in the direction perpendicular to the reasonable door.

16. The method of claim 15, further comprising:
selecting, by the processor, a same number of sparse points on the first segment and the second segment, and calculating, by the processor, a distance value corresponding to each sparse point, wherein the distance value corresponding to each sparse point includes: a first distance value and a second distance value; the first distance value is a distance value from the sparse point to a crossing point at a first side of the sparse point between a straight line passing the sparse point and extending in parallel with the reasonable door, and a boundary of a candidate zone in which the sparse point is located; the second distance value is a distance value from the sparse point to a crossing point at a second side of the sparse point between the straight line passing the sparse point and extending in parallel with the reasonable door and a boundary of the candidate zone in which the sparse point is located, the first side and the second side of the sparse point are two direction of the straight line passing the sparse point and extending in parallel with the reasonable door relative to the sparse point;

calculating, by the processor, a variance based on distance values corresponding to all sparse points within the first candidate zone and the second candidate zone; and reserving, by the processor, the reasonable door as the correct door when the variance is greater than a predetermined value, or fusing, by the processor, the first candidate zone and the second candidate zone into a same zone when the variance is smaller than or equal to the predetermined value.

17. A non-transitory computer-readable storage medium storing computer-executable instructions, which when executed by a processor of an autonomous mobile device, are configured to cause the processor of the autonomous mobile device to perform a method comprising:

obtaining, by the processor, a map of a closed space;

obtaining, by the processor, trajectory points;

processing, by the processor, the trajectory points, and recognizing, by the processor, a correct door in the closed space based on the map and a result of processing the trajectory points; and dividing, by the processor, the closed space into zones based on the correct door and the map, wherein processing, by the processor, the trajectory points and recognizing, by the processor, the correct door in the closed space based on the map and the result of processing the trajectory points, comprises:

determining, by the processor, candidate points based on the trajectory points;

clustering, by the processor, the candidate points into a plurality of clusters and determining, by the processor, cluster representative points in the clusters;

filtering, by the processor, the cluster representative points to determine candidate doors;

filtering, by the processor, the candidate doors to determine reasonable doors; and fusing, by the processor, zones divided by the reasonable doors, and filtering, by the processor, the reasonable doors to obtain the correct door, wherein for each candidate door, an area of a closed zone corresponding to the candidate door is obtained, and a length ratio between a length of the closed zone in a predetermine direction and a length of the candidate door is obtained, and wherein a reasonable door is a candidate door having the area within a predetermined area range and having the length ratio within a predetermined length ratio range.

18. An autonomous mobile device, comprising:

a storage device configured to store computer-readable instructions; and a processor configured to execute the computer-readable instructions to perform a method comprising:

obtaining a map of a closed space;

obtaining trajectory points;

processing the trajectory points, and recognizing a correct door in the closed space based on the map and a result of processing the trajectory points; and dividing the closed space into zones based on the correct door and the map, wherein processing the trajectory points and recognizing the correct door in the closed space based on the map and the result of processing the trajectory points, comprises:

determining candidate points based on the trajectory points;

clustering the candidate points into a plurality of clusters and determining cluster representative points in the clusters;

filtering the cluster representative points to determine candidate doors;

filtering the candidate doors to determine reasonable doors; and fusing zones divided by the reasonable doors, and filtering the reasonable doors to obtain the correct door, wherein for each candidate door, an area of a closed zone corresponding to the candidate door is obtained, and a length ratio between a length of the closed zone in a predetermine direction and a length of the candidate door is obtained. and wherein a reasonable door is a candidate door having the area within a predetermined area range and having the length ratio within a predetermined length ratio range.

* * * * *